United States Patent
Kubota et al.

(10) Patent No.: US 10,480,934 B2
(45) Date of Patent: Nov. 19, 2019

(54) EFFECTIVE SEARCH FOR A SILHOUETTE CONE TO RECONSTRUCT A THREE DIMENSIONAL SHAPE OF AN OBJECT

(71) Applicant: FUJITSU LIMITED, Kawasaki-shi, Kanagawa (JP)

(72) Inventors: Tomonori Kubota, Kawasaki (JP); Yasuyuki Murata, Shizuoka (JP); Masahiko Toichi, Urayasu (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/210,025

(22) Filed: Dec. 5, 2018

(65) Prior Publication Data

US 2019/0195618 A1   Jun. 27, 2019

(30) Foreign Application Priority Data

Dec. 27, 2017  (JP) ................ 2017-252263

(51) Int. Cl.
| | |
|---|---|
| *G01B 11/03* | (2006.01) |
| *G06T 15/20* | (2011.01) |
| *G06T 1/20* | (2006.01) |
| *G06T 7/521* | (2017.01) |

(52) U.S. Cl.
CPC ............. *G01B 11/03* (2013.01); *G06T 1/20* (2013.01); *G06T 7/521* (2017.01); *G06T 15/20* (2013.01)

(58) Field of Classification Search
CPC .......... G01B 11/03; G06T 7/521; G06T 1/20; G06T 15/20

USPC ......................................................... 356/613
See application file for complete search history.

(56) References Cited

U.S. PATENT DOCUMENTS

2010/0034426 A1* 2/2010 Takiguchi .......... G01C 21/3602
382/106

FOREIGN PATENT DOCUMENTS

| JP | 2006-331108 | 12/2006 |
|---|---|---|
| JP | 2009-75117 | 4/2009 |
| JP | 2013-257289 | 12/2013 |

* cited by examiner

*Primary Examiner* — Roy M Punnoose
(74) *Attorney, Agent, or Firm* — Fujitsu Patent Center

(57) ABSTRACT

An apparatus sequentially acquires, from a plurality of reference imaging devices for imaging a silhouette imaged with a base imaging device from viewpoints different from a viewpoint of the base imaging device, silhouette existing position information based on the reference imaging devices, and transforms the silhouette existing position information into a common coordinate system, where the silhouette existing position information indicates an existing position of the silhouette. The apparatus detects a silhouette absence range in which the silhouette does not exist, based on a result of comparison of the silhouette existing position information acquired this time and the silhouette existing position information acquired last time, and searches a range in which the silhouette exists, based on the silhouette absence range.

16 Claims, 32 Drawing Sheets

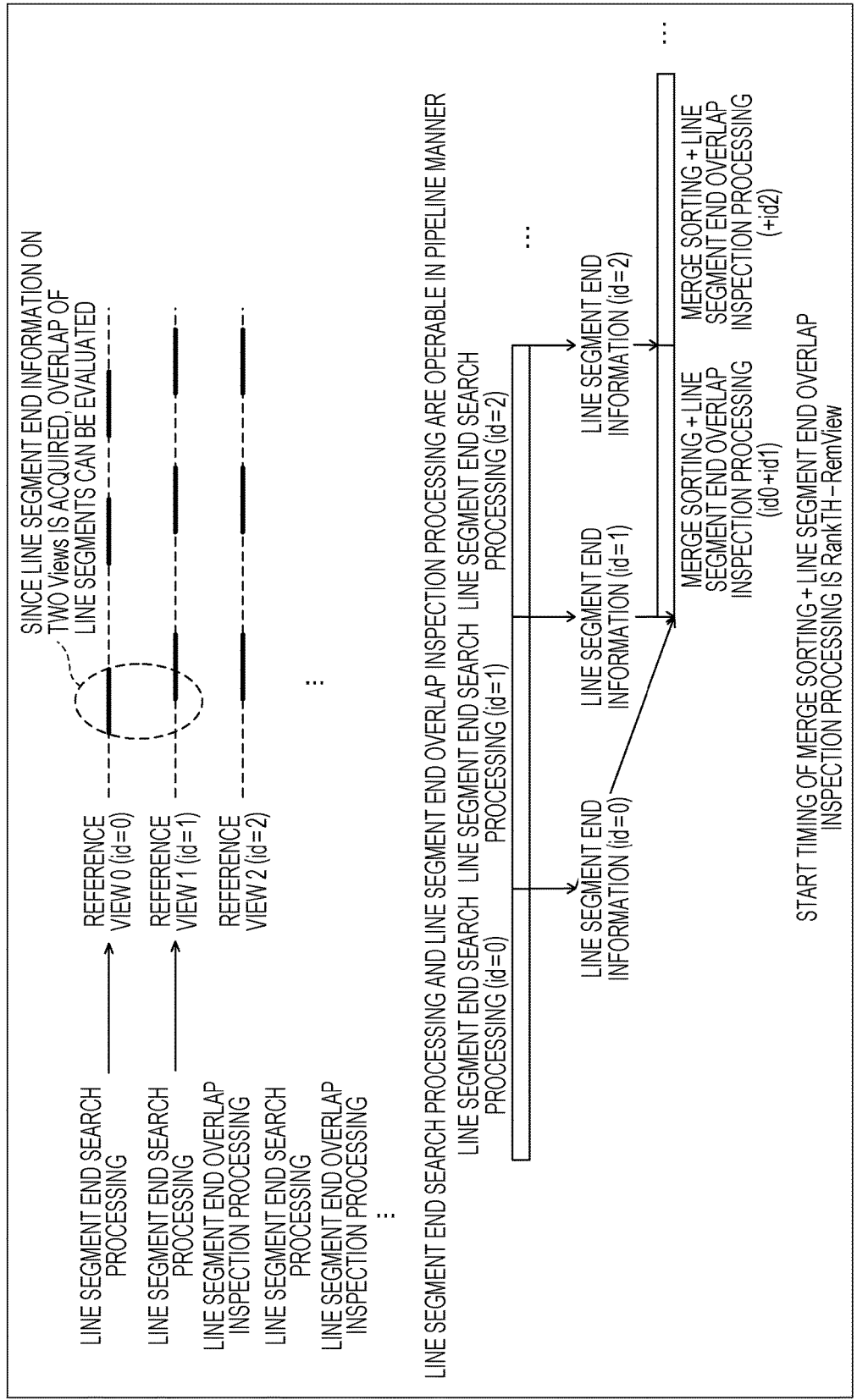

FIG. 15

Near SUB-LINE SEGMENT END INFORMATION STORAGE AREA

| | Elm[0] | ... | E1.z[1] | ... | E1.z[3] | ... | E1.z[2] | Elm[4]<br>E1.z[4] =maxE1.z |
|---|---|---|---|---|---|---|---|---|
| z COORDINATE | Near.z | | | | | | | |
| NUMBER OF OVERLAPS | 4 | | 3 | | 2 | | 1 | 0 |
| Rank THRESHOLD<br>VALUE RankTH | RankTH-4 | | RankTH-3 | | RankTH-2 | | RankTH-1 | RankTH-0 |

Near SUB-LINE SEGMENT END INFORMATION STORAGE AREA

|  | Elm[0] | ... | E1.z[1] | ... | E1.z[3] | ... | E1.z[2] | ... | Elm[4] =maxE1.z E1.z[4] |
|---|---|---|---|---|---|---|---|---|---|
| z COORDINATE | Near.z |  |  |  |  |  |  |  |  |
| NUMBER OF OVERLAPS [0] (near→far) | 4 |  | 3 |  | 3 |  | 1 |  | 0 |
| NUMBER OF OVERLAPS [1] (far→near) | 0 |  | 4 |  | 3 |  | 2 |  | 1 |
| Rank THRESHOLD VALUE RankTH'[0] | RankTH-4 |  | RankTH-3 |  | RankTH-2 |  | RankTH-1 |  | RankTH-0 |
| Rank THRESHOLD VALUE RankTH'[1] | RankTH-0 |  | RankTH-4 |  | RankTH-3 |  | RankTH-2 |  | RankTH-1 |

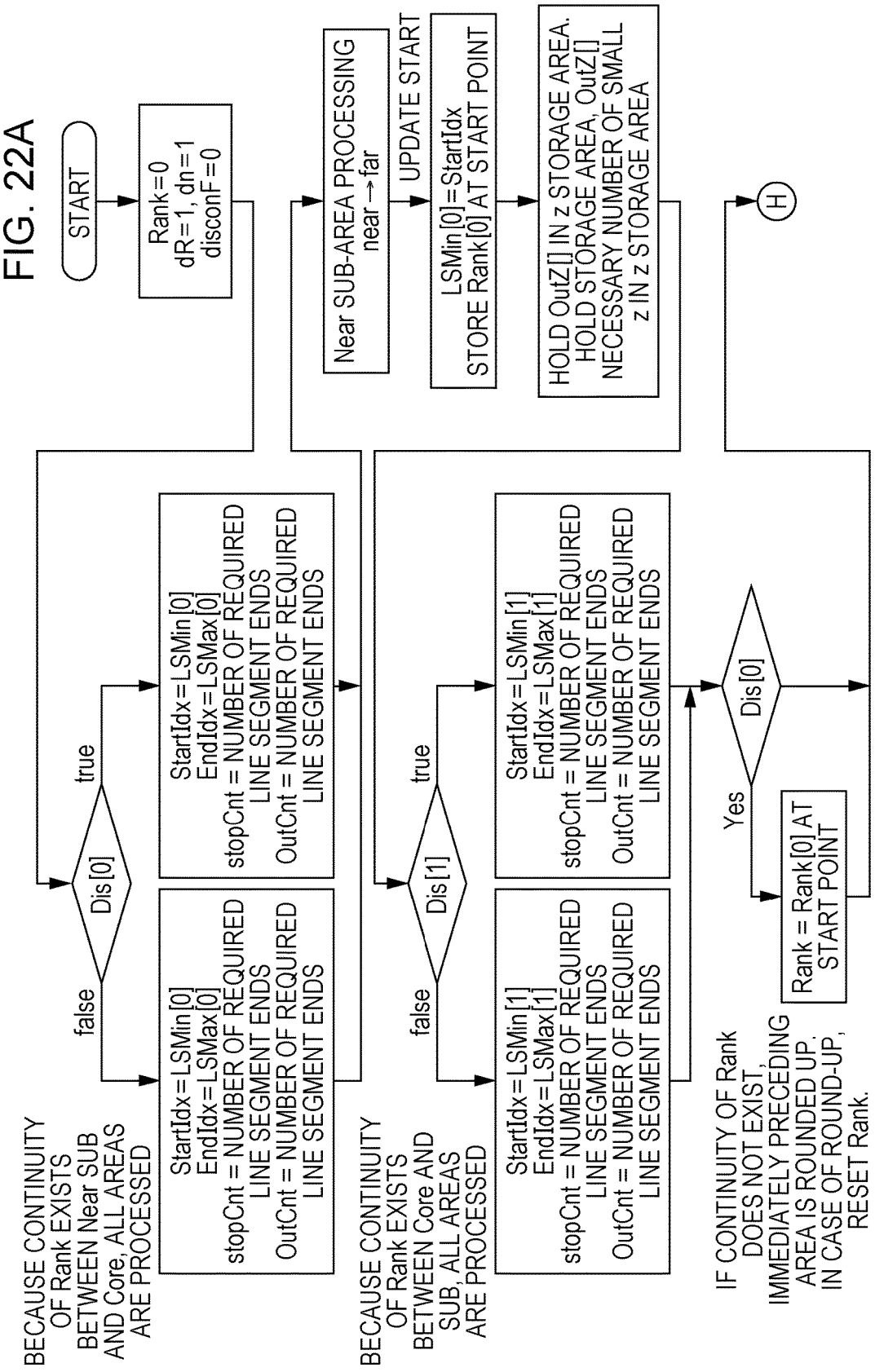

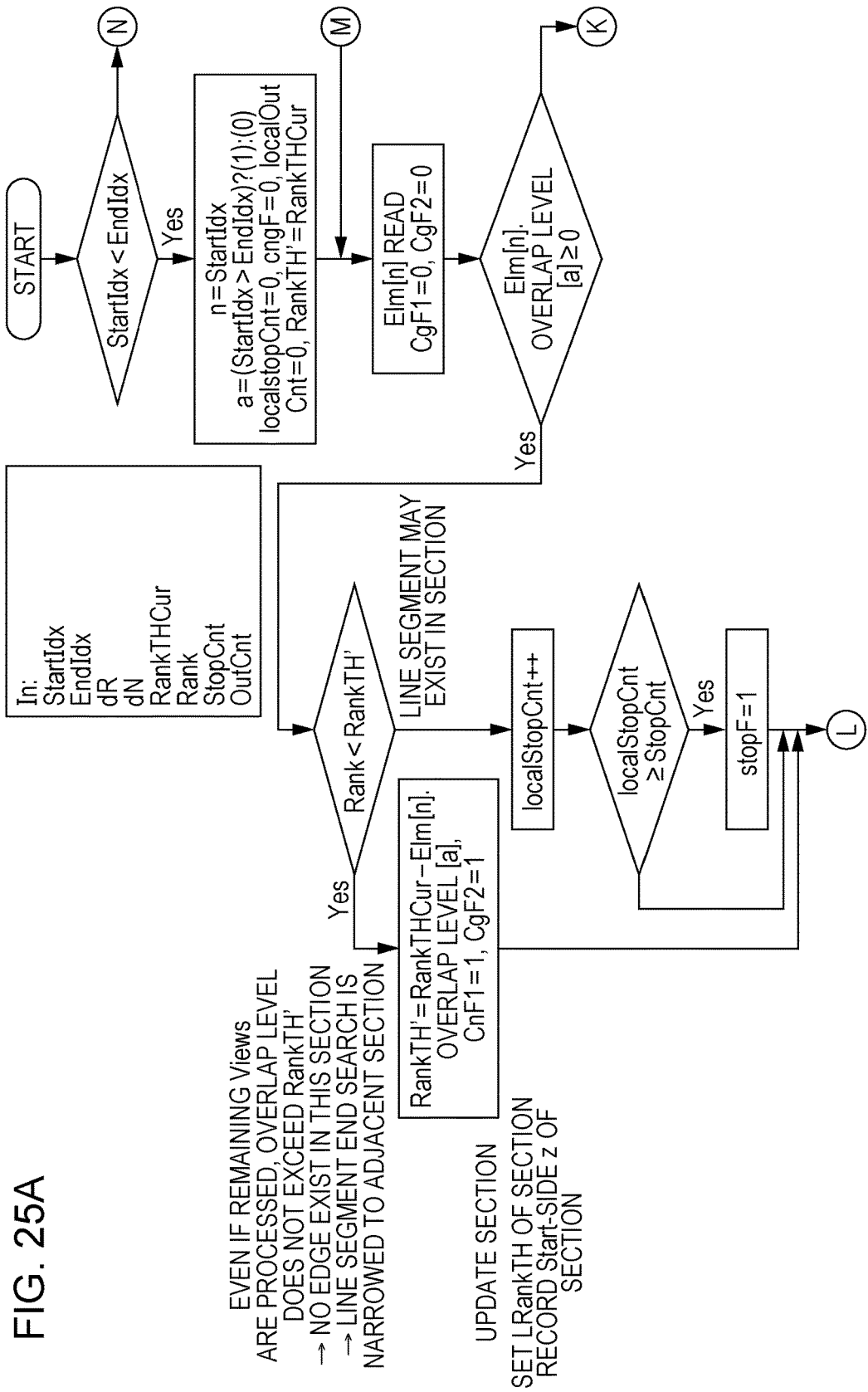

EFFECTIVE SEARCH FOR A SILHOUETTE CONE TO RECONSTRUCT A THREE DIMENSIONAL SHAPE OF AN OBJECT

CROSS-REFERENCE TO RELATED APPLICATION

This application is based upon and claims the benefit of priority of the prior Japanese Patent Application No. 2017-252263, filed on Dec. 27, 2017, the entire contents of which are incorporated herein by reference.

FIELD

The embodiment discussed herein is related to effective search for a silhouette cone to reconstruct a three dimensional shape of an object.

BACKGROUND

Image processing techniques of acquiring two-dimensional information of an object to be measured, and estimating three dimensional information of the object based on the two-dimensional information have been known.

According to a first image processing technique, when performing a matching operation between two images acquired from an object to be measured, highly precise matching result may be acquired in a short period of time (for example, Japanese Laid-open Patent Publication No. 2006-331108). According to the first technique, in stereo measurement using Dynamic Programming (DP) matching, an area where there is no change in the luminance values of corresponding pixels between frames succeeds the route searching result of the preceding frame. An area where there is no change in the luminance values of corresponding pixels between adjacent scanning lines in one frame processing succeeds the route searching result of the just preceding scanning line.

According to a second technique, for example, in searching a feature point of an object on an epipolar line of a second image, false detection is checked while calculating a distance from a first camera to the object with high accuracy (for example, Japanese Laid-open Patent Publication No. 2013-257289). According to the second technique, an image processing device acquires a first image formed by imaging a workpiece with a main camera, and a second image formed by imaging the workpiece with a sub camera having a line of sight different from the main camera. Then, the image processing device searches on an epipolar line of the second image, to specify a feature point of the workpiece on the second image, and calculates a distance to the workpiece by stereo method. At this time, based on the number of pixels of a feature quantity of the workpiece stored in advance in the storage device and the distance to the workpiece, an approximate value of the distance between the main camera and the workpiece is calculated from the number of pixels of the feature quantity of the workpiece in the first image. Then, according to the approximate value of the distance, the image processing device sets a search range for searching a feature point of the workpiece on the epipolar line in the second image so as to narrow the search range.

According to a third technique, for example, a position of a feature in the periphery of a road is measured (for example, Japanese Laid-open Patent Publication No. 2009-75117). According to the third technique, an image with the photographed periphery of the road is stored in an image storage part. A three dimensional point group model storage unit stores a point group indicating three dimensional coordinates obtained by laser measurement executed simultaneously with the photographing of the image, as a road surface shape model. A model projection part projects the point group onto the image, and an image display part displays the image and the point group superimposed together on a display. A user assigns a pixel on a measuring-objective feature as a measuring image point by an image point input part. A vicinity extracting part extracts a point positioned in the vicinity of the measuring image point and superposed with the measuring-objective feature, from the point group. A feature position calculating part outputs the three dimensional coordinates indicated by the extracted point, as the three dimensional coordinates of the measuring-objective feature.

SUMMARY

According to an aspect of the embodiments, an apparatus sequentially acquires, from a plurality of reference imaging devices for imaging a silhouette imaged with a base imaging device from viewpoints different from a viewpoint of the base imaging device, silhouette existing position information based on the reference imaging devices, and transforms the silhouette existing position information into a common coordinate system, where the silhouette existing position information indicates an existing position of the silhouette. The apparatus detects a silhouette absence range in which the silhouette does not exist, based on a result of comparison of the silhouette existing position information acquired this time and the silhouette existing position information acquired last time, and searches a range in which the silhouette exists, based on the silhouette absence range.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 11 is a view for describing at a start timing of line segment overlap inspection processing in pipeline processing;

FIG. 15 is a view for describing a Near sub-line segment end information area according to the present embodiment;

FIGS. 22A and 22B are views for describing contents of processing of performing the line segment overlap inspection processing from the near side to the far-side;

FIGS. 25A and 25B are flow charts illustrating a flow of the Near sub-area processing, the Core area processing, and the Far sub-area processing in FIGS. 22A to 23B;

DESCRIPTION OF EMBODIMENTS

One of techniques of reconstructing the three dimensional shape of an object based on the two-dimensional information on the object is visual hull which reconstructs the three dimensional shape of the object from an object silhouette image in a multi-viewpoint video. According to this type of technique, in processing of deriving a silhouette cone, the operation amount required for searching for a line segment at which an epipolar line and a silhouette cross each other is large. In addition, in searching the line segment, since a section where the epipolar line and the silhouette do not cross each other is included in a search range, the operation amount in the search processing becomes large, increasing processing time.

It is preferable to speed up the processing of searching the line segment where the epipolar line and the silhouette cross each other at deriving of the silhouette cone.

Figure 1:
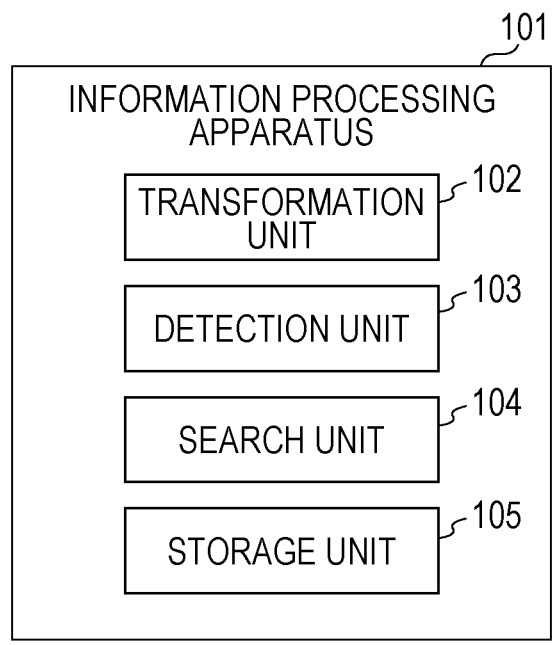
FIG. 1 is a view illustrating an example of an information processing apparatus according to the present embodiment.

FIG. 1 is a view illustrating an example of an information processing apparatus according to the present embodiment. As illustrated in FIG. 1, an information processing apparatus 101 includes a transformation unit 102, a detection unit 103, a search unit 104, and a storage unit 105.

The transformation unit 102 sequentially acquires silhouette existing position information from each of a plurality of reference imaging devices (reference cameras) for imaging a silhouette taken with a base imaging device (base camera) from viewpoints different from the viewpoint of the base imaging device, and transforms the silhouette existing position information into a common coordinate system. The silhouette existing position information is information indicating the silhouette existing position based on the reference imaging devices. An example of the transformation unit 102 is a z coordinate to reference[F] local coordinate transformation unit 16 (see FIG. 7).

The detection unit 103 compares the silhouette existing position information acquired this time with the silhouette existing position information acquired last time. The silhouette existing position information acquired last time is stored in, for example, the storage unit 105. Based on a result of the comparison, the detection unit 103 detects a silhouette absence range indicating a range in which the silhouette does not exist. An example of the detection unit 103 is a line segment overlap inspection unit 18 (see FIG. 7).

Based on the silhouette absence range, the search unit 104 searches for the range in which the silhouette exists. Examples of the search unit 104 are a search range determination unit 14 and a line segment search unit 15 (see FIG. 7).

With such configuration, the information processing apparatus 101 according to the present embodiment may speed up the search processing of the line segment where the epipolar line and the silhouette cross each other in deriving the silhouette cone for reconstructing the three dimensional shape of the object from a multi-viewpoint video by the visual hull.

The detection unit 103 accumulates the silhouette absence range, compares the accumulated silhouette absence range with the silhouette existing position information acquired this time, and detects the silhouette absence range based on a result of the comparison. This processing corresponds to processing executed in Step S11 (see FIG. 8) and Steps S24 to S26 (see FIG. 9) by a Central Processing unit (CPU) 22 (see FIG. 28). As described above, the search unit 104 searches for the range in which the silhouette exists, based on the silhouette absence range. This processing corresponds to processing in Step S10 (see FIG. 8) executed by the CPU 22.

With such configuration, in the line segment search processing executed by the information processing apparatus 101 in the present embodiment, an unnecessary range in the found line segment search range may be reflected on a next line segment search based on the silhouette existing position information acquired from another reference imaging device.

Through pipeline processing, the detection unit 103 may check whether or not newly acquired silhouette existing position information overlaps with existing silhouette absence range to detect the silhouette absence range. In this case, the detection unit 103 adds the silhouette absence range detected based on the detection result to the existing silhouette absence range.

With such configuration, for line segment search, through the pipeline processing, the information processing apparatus 101 according to the present embodiment may gradually add the unnecessary search range to narrow the search range.

Figure 2:
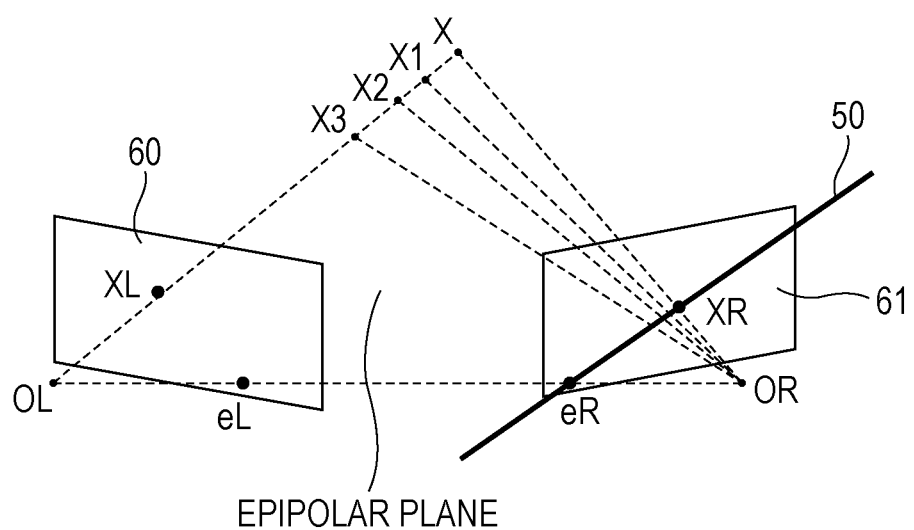
FIG. 2 is a view illustrating epipolar geometry.

The present embodiment will be described below in detail. FIG. 2 is a view for describing epipolar geometry. The epipolar geometry is geometry for reconstructing depth information on an object in a three dimensional space from two images that include the object and have different viewpoints.

A point OL and a point OR in FIG. 2 are a projection center of an L camera (base camera) and a projection center of an R camera (reference camera), respectively. A point XL and a point XR in FIG. 2 are points (silhouettes) acquired by projecting a point X in the three dimensional space (actual space) onto a projection plane 60 of the L camera and a projection plane 61 of the R camera, respectively.

Since the two cameras are located at different three dimensional positions, one camera may view the other camera. A point eL and a point eR in FIG. 2 each are a point referred to as an epipole or an epipolar point, which is acquired by projecting the other camera (projection center) onto the projection plane of the camera of its own. That is, the point eL on the projection plane 60 of the L camera is a point acquired by projecting the projection center OR of the R camera onto the projection plane 60, and the point eR on the projection plane 61 of the R camera is a point acquired by projecting the projection center OL of the L camera onto the projection plane 61. Here, the projection centers (the point OL and the point OR) and the epipoles (the point eL and the point eR) exist on the same straight line in the three dimensional space.

In FIG. 2, a straight line 50 that passes the projection plane 61 of the R camera is a straight line referred to as epipolar line, which is acquired by a straight line passing the point OL and the point X onto the projection plane 61 of the R camera.

Given that the L camera is the base camera and the R camera is the reference camera, a point in the three dimensional space, which corresponds to the point XL on the projection plane 60 of the L camera, exists on a straight line passing the point OL and the point X. A point in the three dimensional space, which corresponds to the point XL on the projection plane 60 of the L camera, exists on the epipolar line 50 on the projection plane 61 of the R camera. For example, if a point in the three dimensional space, which corresponds to the point XL on the projection plane 60 of the L camera, is a point X, the point X is projected onto an intersection of a line segment connecting the projection center OR to the point X and the epipolar line 50, on the projection plane 61 of the R camera.

If the positional relation between the two cameras is known, following epipolar restrictions hold. That is, when the point XL on the projection plane 60 of the L camera of the point X is given, a line segment eR-XR on the projection plane 61 of the R camera is defined. The point XR on the projection plane 61 of the R camera of the point X exists on the epipolar line 50. For example, when the three dimensional position corresponding to the point XL on the projection plane 60 of the L camera is the point $X_1$, the point corresponding to the point $X_1$ on the projection plane 61 of the R camera is an intersection of a line segment connecting the projection center OL to the point $X_1$ and the epipolar line 50. Similarly, when the three dimensional position corresponding to the point XL on the projection plane 60 of the L camera is the point $X_2$ or $X_3$, the point corresponding to the point $X_2$ or $X_3$ on the projection plane 61 of the R camera is an intersection of a line segment connecting the projection center OL to the point $X_2$ or $X_3$ and the epipolar line 50.

When two cameras capture the same point as described above, the point necessarily exists on both epipolar lines. That is, if the point on one projection plane does not exist on the epipolar line passing the other projection plane, the cameras do not capture the same point (association is not correct). Thus, where a point X viewed from one camera is projected on the other camera may be found by examining the epipolar lines. If the association is correctly made and the positions of the point XL and the point XR are known, the position of the point X in the three dimensional space may be determined by trigonometry. The information processing apparatus 101 according to the present embodiment reconstructs the three dimensional shape of an object from a multi-viewpoint video by the visual hull based on the above-mentioned epipolar restrictions.

Figure 3B:
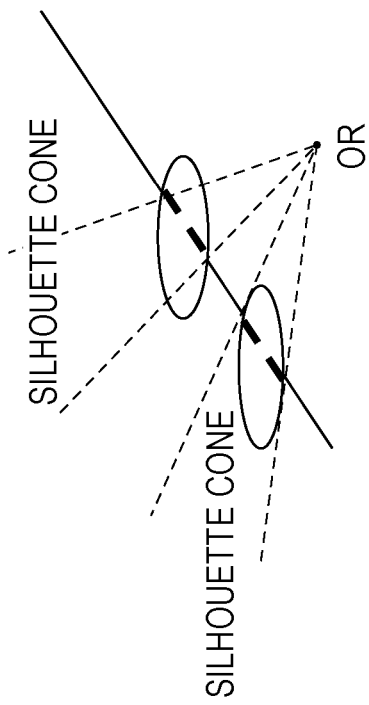
FIGS. 3A and 3B are views for describing silhouette cone.
Figure 3A:
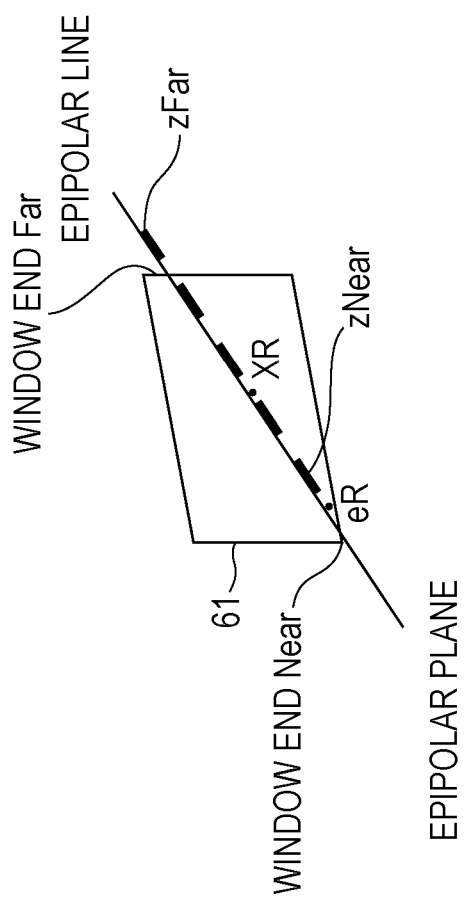

FIGS. 3A and 3B are views for describing silhouette cone. A point zNear and a point zFar in FIG. 3A represent both ends of a field of view range on the epipolar line 50 passing the projection plane 61 of the R camera. The point zNear is the nearest point to the epipole (the point eR) on the epipolar line 50, and the point zFar is the farthest point from the epipole (here, the point eR) on the epipolar line 50. A window end Near in FIG. 3A represents an end of the projection plane 61 on the side of the point zNear on the epipolar line 50. A window end Far in FIG. 3A represents an end of the projection plane 61 on the side of the point zFar on the epipolar line 50.

According to the visual hull, line segment search (intersection search) for confirming existence/absence of the silhouette (point X) in a range from Max (zNear, window end Near) to Min (zFar, window end Far) on the epipolar line 50 is performed. Here, Max (zNear, window end Near) represents the further point from the epipole eR out of the point zNear and the window end Near, and Min (zFar, window end Far) represents the nearer point to the epipole eR out of the point zFar and the window end Far.

A line segment to be searched includes a line segment representing a surface of the object viewed from the view point (the projection center OL) of the L camera, and a line segment representing the background. When the line segment (two-dimensional silhouette) acquired by line segment search is back-projected in the three dimensional space based on the projection center OR, as illustrated in FIG. 3B, a cone (silhouette cone) having the projection center OR as an apex is acquired. According to the visual hull, the three dimensional shape of the object is reconstructed based on a visual hull of silhouette cones of the same object derived from a plurality of images in the three dimensional space. In this case, the line segment ends on the epipolar line 50 may be a candidate for the surface of the three dimensional object.

Here, using the reference camera F (F=0 . . . the number of reference cameras−1), line segment search is performed in the range from Max (zNear, window end Near) to Min (zFar, window end Far).

Figure 4:
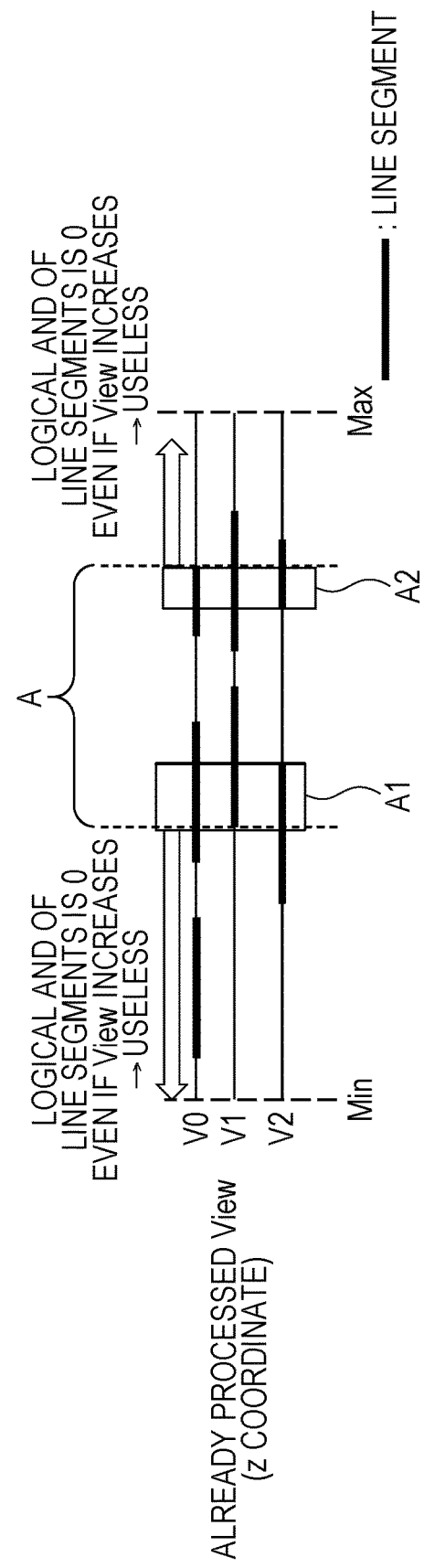
FIG. 4 is a view for describing the range of line segment search.

FIG. 4 is a view for describing the range of line segment search. FIG. 4 illustrates the result of line segment search about each of three reference views (V0, V1, and V2) using a common z coordinate. In calculating the z coordinate of the object from the three reference views, it may be deemed that the object exists in a line segment range in which the logical AND of the three line segments is 1. Here, in the case where thick solid lines in the results of line segment search in FIG. 4 represent the object existing range, sections A1 and A2 that are thick solid lines in all of the three reference views (V0, V1, and V2) become a candidate for the z coordinate of the object. That is, in the example in FIG. 4, in the sections other than the sections A1 and A2, even if the reference view increases, the logical AND of the line segments is 0. Thus, these sections do not become a candidate for the z coordinate of the object. When the range in which the logical AND is 0 is included in the search range, the number of memory accesses and the operation amount in the search processing become large, to increase the memory for storing line segment information in size. The processing of comparing the dimension of line segment ends is performed by sorting. That is, the line segment search processing may be said to be excessive for the objective to search overlap sections in the line segments of all views.

Thus, according to the present embodiment, the line segment search processing of reconstructing the three dimensional shape of the object from object silhouette images in a multi-viewpoint video by the visual hull, the memory access and the operation amount in line segment search is decreased by narrowing the range of line segment search. For example, in FIG. 4, line segment search of the other reference views becomes unnecessary by performing line segment search using the section A including the sections A1 and A2 as the search range. This may narrow the search range to reduce the number of memory accesses and the operation amount. According to the present embodiment, the memory area for storing the line segment information is reduced. Further, according to the present embodiment, the number of line segments to be confirmed in terms of overlap is reduced to cut the operation amount.

Figure 5:
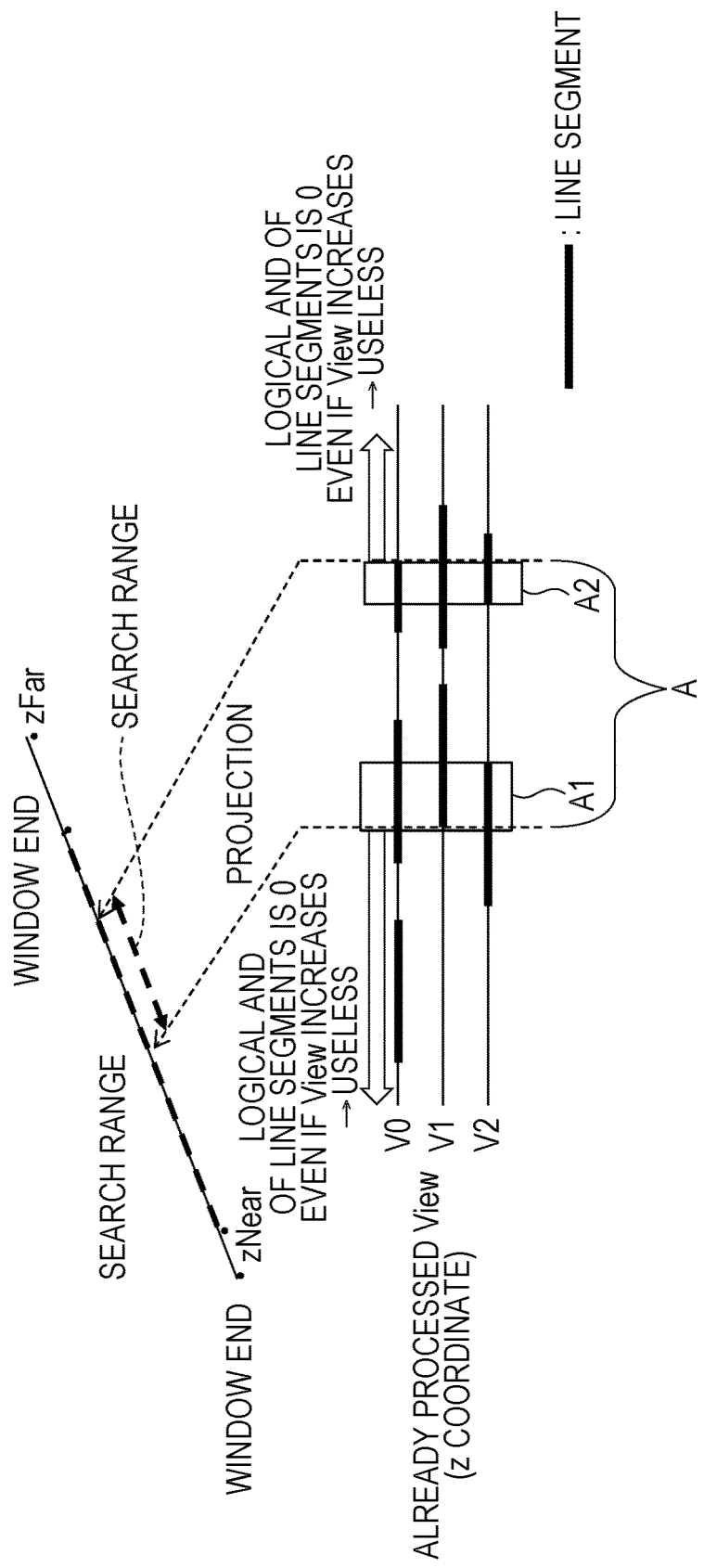
FIG. 5 is a view for describing that a maximum depth and a minimum depth in a line segment overlap range of already processed reference views are used to narrow the line segment search range of subsequent reference views according to the present embodiment.

FIG. 5 is a view for describing that a maximum depth and a minimum depth in a line segment overlap range of already processed reference views are used to narrow the line segment search range of subsequent reference views according to the present embodiment.

As illustrated in FIG. 5, in the present embodiment, the range in which the overlap of line segments not be checked is excluded from the search range. In FIG. 5, one section A, which includes the sections A1 and A2 having the logical AND of 1 and minimizes the search range, is defined as the search range. That is, the section A defined as the search range in FIG. 5 actually includes a section not to be searched. For this reason, for example, when setting the search range of the reference view that is different from the reference views (V0, V1, and V2) in FIG. 5, only the segment between one end (maximum depth) and the other end (minimum depth) of the section A may be searched. The maximum depth is a further end from the epipole in the section A, and the minimum depth is a nearer end to the epipole in the section A. This may narrow the range of line segment search of subsequent reference views, thereby reducing the number of memory accesses and the operation amount in the search processing, as well as the size of the memory for storing line segment information.

Figure 6:
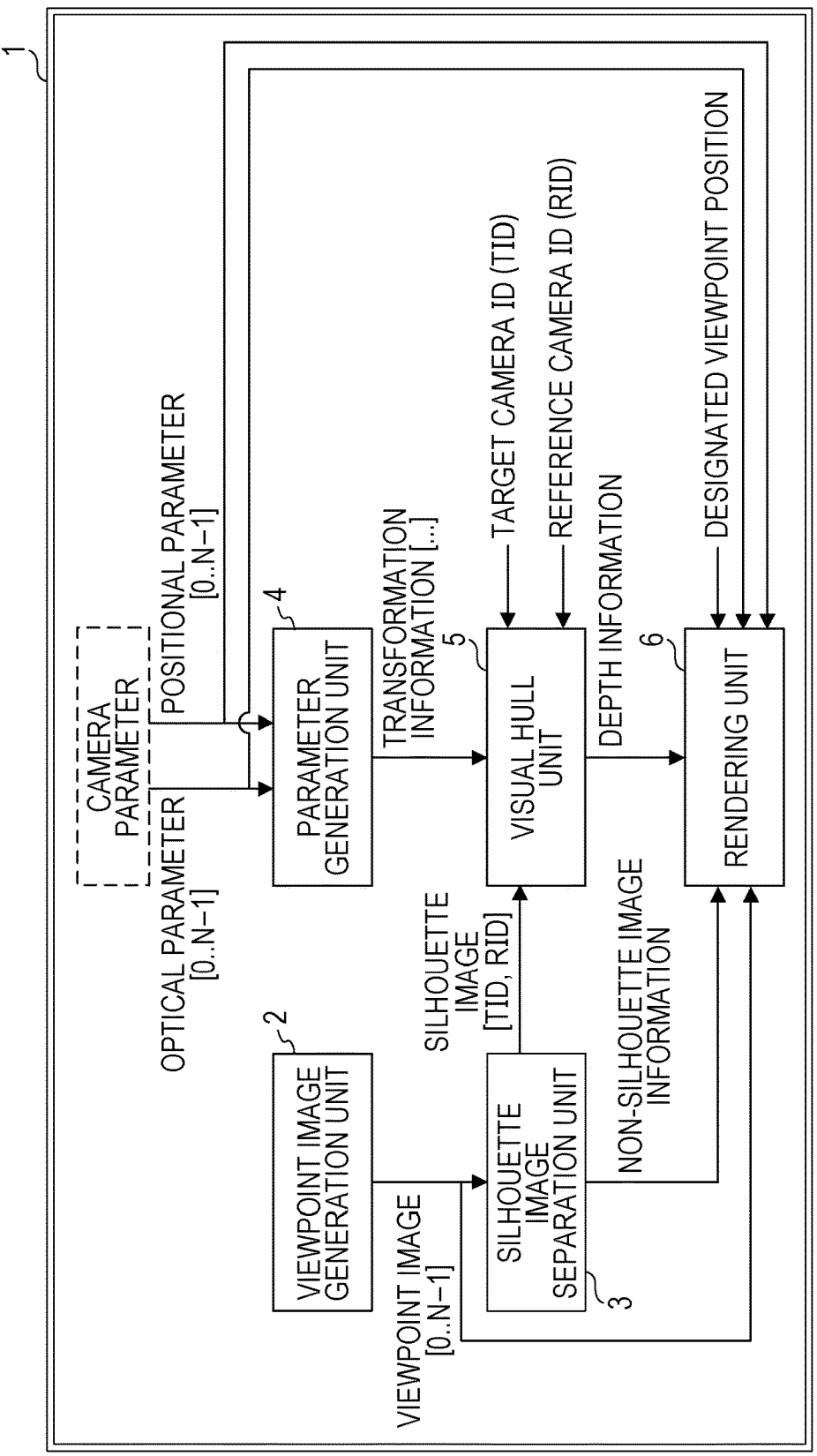
FIG. 6 is a view illustrating an example of a three dimensional shape reconstruction apparatus according to the present embodiment.

FIG. 6 is a view illustrating an example of a three dimensional shape reconstruction apparatus according to the present embodiment. As illustrated in FIG. 6, a three dimensional shape reconstruction apparatus 1 includes a viewpoint image generation unit 2, a silhouette image separation unit 3, a parameter generation unit 4, a visual hull unit 5, and a rendering unit 6.

The viewpoint image generation unit 2 generates images (viewpoint images) taken from a plurality of different viewpoints, or acquires images from outside.

The silhouette image separation unit 3 separates silhouette images of the object (subject) from the viewpoint images generated by the viewpoint image generation unit 2.

The parameter generation unit 4 acquires camera parameters (including optical parameters [0 . . . N−1] and positional parameters [0 . . . N−1]) to generate various parameters (transformation information).

The visual hull unit 5 acquires the silhouette image taken with the base camera (target camera) and the silhouette image taken with the reference camera from the silhouette image separation unit 3. The visual hull unit 5 acquires an ID (target camera ID (TID)) for identifying the target camera and an ID (reference camera ID (RID)) for identifying the reference camera. The visual hull unit 5 acquires the transformation information generated by the parameter generation unit 4. The visual hull unit 5 calculates depth information from TID, RID, transformation information, silhouette images [TID,RID].

The rendering unit 6 acquires the camera parameters (optical parameters [0 . . . N−1], positional parameters [0 . . . N−1]), the depth information calculated by the visual hull unit 5, non-silhouette image information generated by the silhouette image separation unit 3, the viewpoint images [0 . . . N−1] outputted from the viewpoint image generation unit 2, and designated viewpoint positions. The rendering unit 6 generates a three dimensional image of the object viewed from the designated viewpoint positions.

Figure 7:
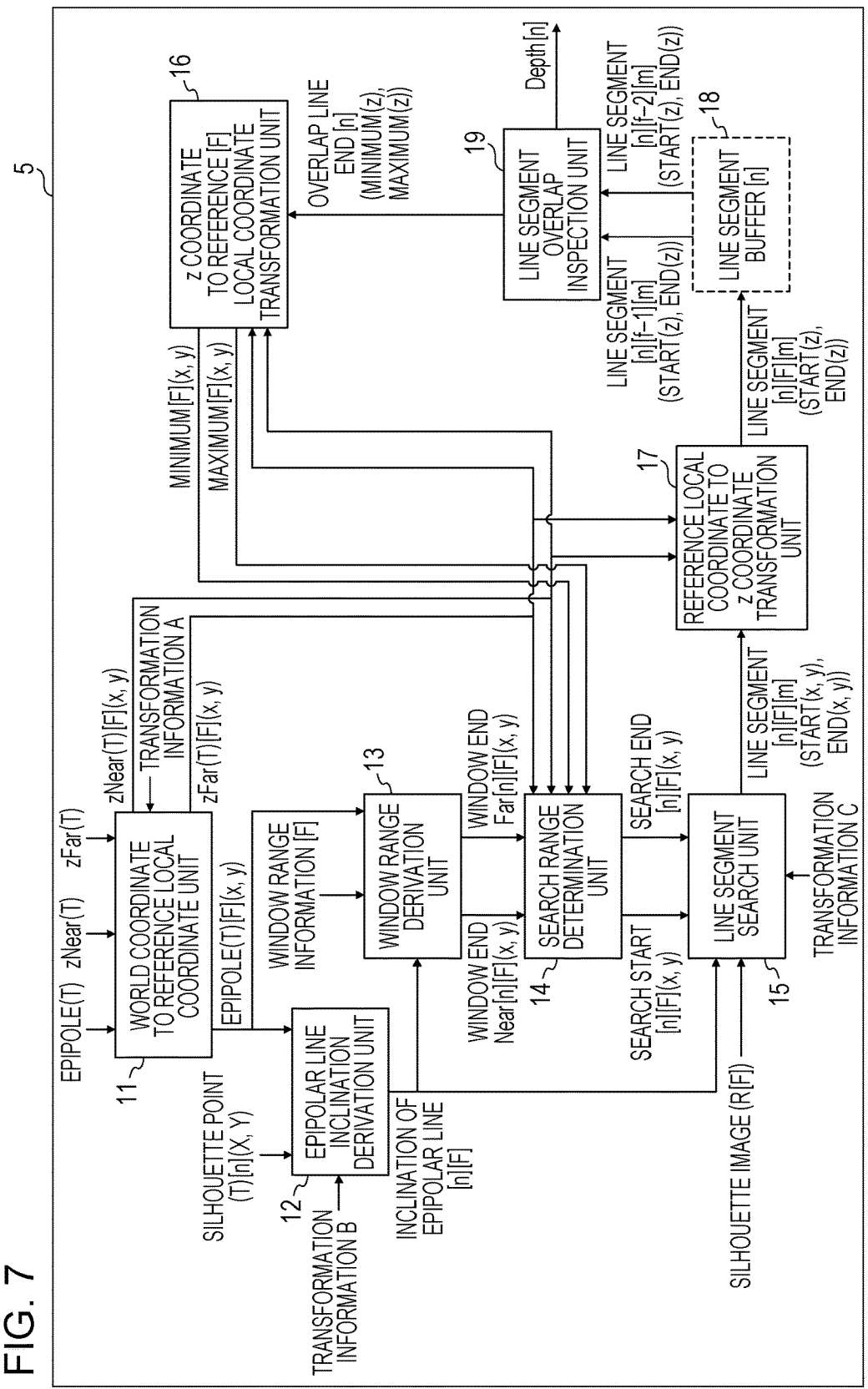
FIG. 7 is a view illustrating a configuration of a visual hull unit.

FIG. 7 is a view illustrating a configuration of the visual hull unit. As illustrated in FIG. 7, the visual hull unit 5 includes a world coordinate to reference local coordinate transformation unit 11, an epipolar line inclination derivation unit 12, a window range derivation unit 13, a search range determination unit 14, and a line segment search unit 15. The visual hull unit 5 further includes a z coordinate to reference[F] local coordinate transformation unit 16, a reference local coordinate to z coordinate transformation unit 17, a line segment buffer[n] 18, and a line segment overlap inspection unit 19.

Figure 8A:
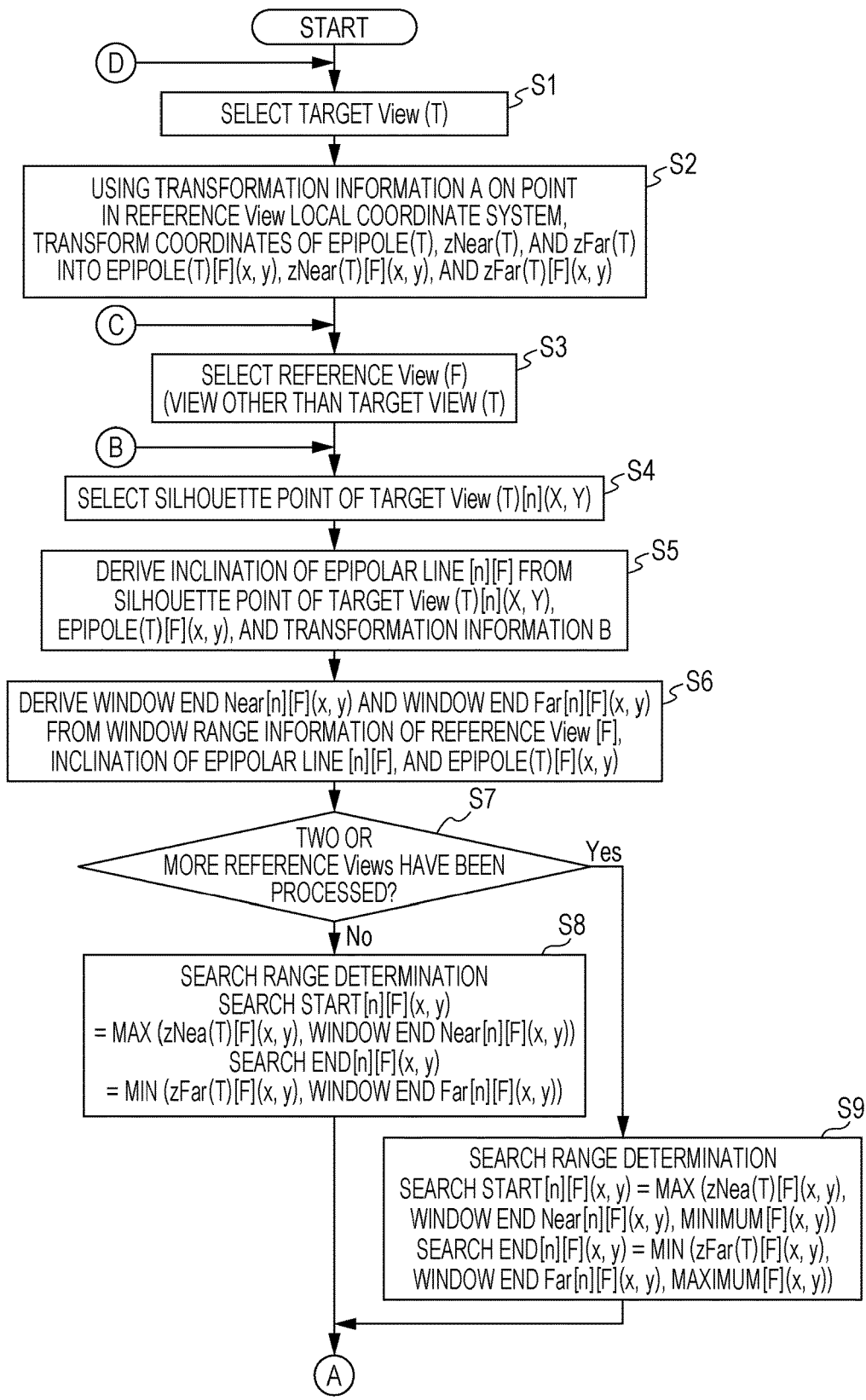
FIGS. 8A and 8B are flowcharts illustrating a processing flow line segment search according to the present embodiment.
Figure 8B:
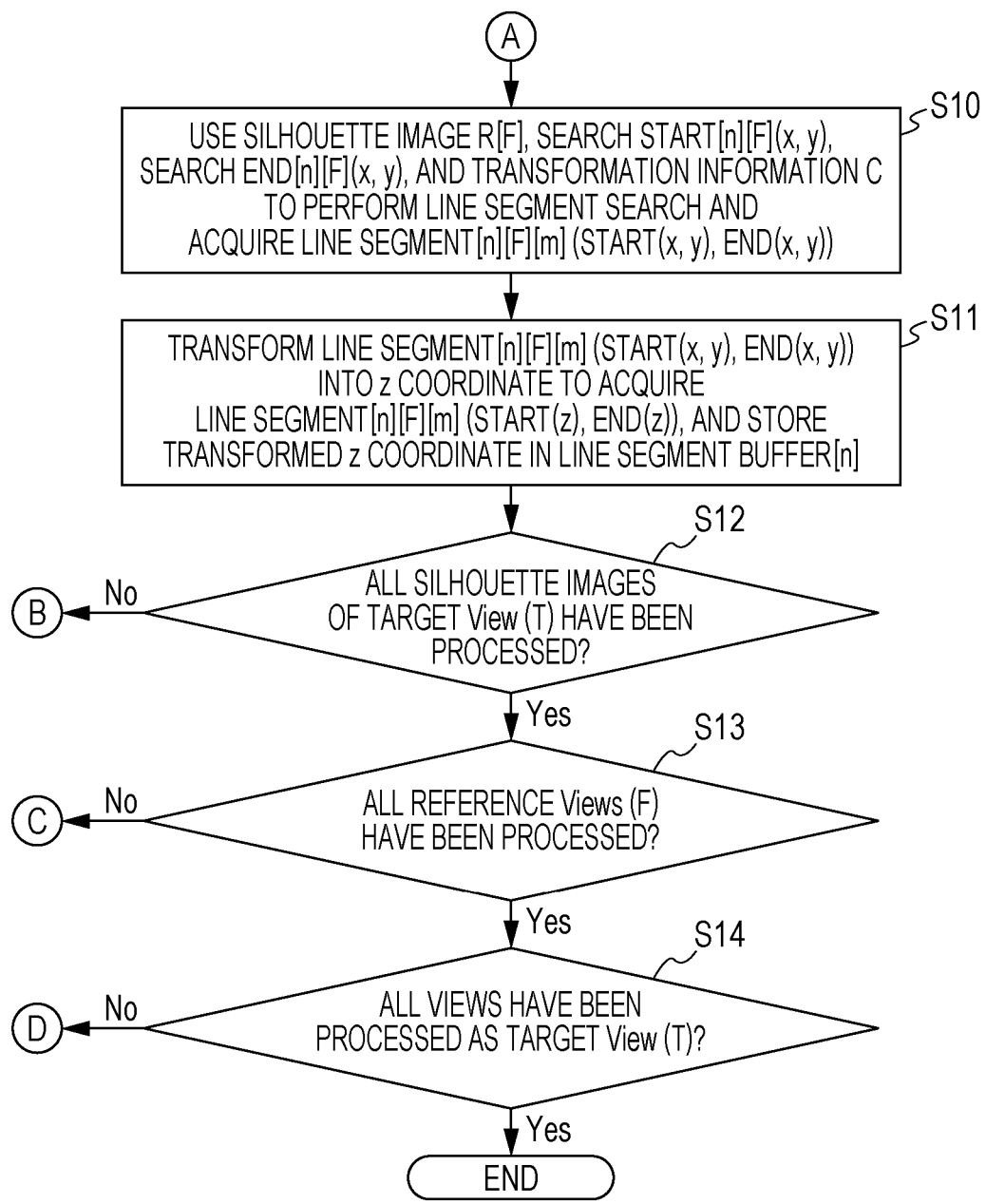

FIGS. 8A and 8B are flow charts illustrating a processing flow of line segment search according to the present embodiment. FIGS. 8A and 8B will be described below with reference to FIG. 7.

In FIG. 8A, in the line segment search processing, first, a target view (T) is selected (Step S1). Here, "T" denotes information that designates the target camera (base camera) among a plurality of cameras.

Next, the world coordinate to reference local coordinate transformation unit 11 transforms the world coordinates into the reference local coordinates. That is, using transformation information A, the world coordinate to reference local coordinate transformation unit 11 transforms coordinates of epipole(T), ZNear(T), and zFar(T) into epipole(T)[F](x, y), zNear(T)[F](x, y), and zFar(T)[F](x, y) (Step S2). Here, "F" is information that identifies the reference camera (F=0, 1, 2, . . . the number of reference cameras−1). Then, [n] is information that identifies the silhouette point (x, y) of the target view.

Next, a reference view (F) is selected from views other than the target view (T) (Step S3). Then, a silhouette point of target view (T)[n](X, Y) is selected (Step S4).

Next, the epipolar line inclination derivation unit 12 derives an inclination of epipolar line[n][F] from silhouette point of target view (T)[n](x, y), epipole(T)[F](x, y), and transformation information B (Step S5).

Next, the window range derivation unit 13 derives the window end Near(n)[F](x, y) and the window end Far(n)[F](x, y) from window range information of reference view [F], the inclination of epipolar line[n][F], and the epipole (T)[F](x, y) (Step S6).

Then, for example, to determine the search range, the search range determination unit 14 determines whether or not two or more reference views have been processed (Step S7). In other words, in Step S7, it is determined whether or not line segment search for two or more views among views other than the view selected as the target view has been performed.

If two or more reference views have not been processed (Step S7; No), the search range determination unit 14 substitutes Max (zNear(T)[F](x, y), window end Near[n][F](x, y)) into search start[n][F](x, y). The search range determination unit 14 substitutes Min (zFar(T)[F](x, y), window end Far[n][F](x, y)) into search end[n][F](x, y) (Step S8).

On the contrary, if two or more reference views have been processed (Step S7; Yes), the search range determination unit 14 substitutes Max (zNear(T)[F](x, y), window end Near[n][F](x, y), minimum[F](x, y)) into search start[n][F](x, y). The search range determination unit 14 substitutes Min (zFar(T)[F](x, y), window end Far[n][F](x, y), maximum[F](x, y)) into search end[n][F](x, y) (Step S9).

After the processing in Step S8 or S9, the line segment search unit 15 uses silhouette image R[F], search start[n][F](x, y), search end[n][F](x, y), and transformation information C to perform line segment search, acquiring line segment[n][F][m] (start(x, y), end(x, y)) (Step S10) illustrated in FIG. 8B. Here, m denotes an index for identifying the line segment detected in line segment search.

Next, the reference local coordinate to z coordinate transformation unit 17 transforms line segment[n][F][m] (start(x, y), end(x, y)) from the reference local coordinates into the z coordinate to acquire line segment[n][F][m] (start(z), end(z)), and stores the transformed z coordinate in the line segment buffer[n] 18 (Step S11).

After the processing in Step S11, the visual hull unit 5 determines all silhouette images of the target view (T) have been processed (Step S12). If any unprocessed silhouette image exists (Step S12; No), the visual hull unit 5 repeats the processing in Step S4 and subsequent steps.

If all silhouette images of the target view (T) have been processed (Step S12; Yes), the visual hull unit 5 determines whether or not all reference views(F) have been processed (Step S13). If any unprocessed reference view (F) exists (Step S13; No), the visual hull unit 5 repeats the processing in Step S3 and subsequent steps.

If all reference views(F) have been processed (Step S13; Yes), the visual hull unit 5 determines whether or not the processing in Step S1 and subsequent steps has been executed using all views as the target view (T) (Step S14). If any view that has not been selected as the target view (T) exists (Step S14; No), the visual hull unit 5 repeats the processing in Step S1 and subsequent steps. Then, when the processing in Step S1 and subsequent steps are executed using all views as the target view (T), the visual hull unit 5 finishes the line segment search processing for the set of views to be processed.

As described above, the three dimensional shape reconstruction apparatus 1 (information processing apparatus 101) according to the present embodiment sets, in the case where one view is selected as the target view, different search ranges to the case where the processing for the reference view is performed on the first or second time, and the case where the processing for the reference view is performed on the third time and thereafter. Moreover, if the processing for the reference view is performed on the third time and thereafter, the visual hull unit 5 sets the minimum section A including the section in which the logical AND becomes 1 as a result of line segment search in the already processed reference view, to the search range in the reference view to be processed. Accordingly, three dimensional shape reconstruction apparatus 1 (information processing apparatus 101) according to the present embodiment may effectively execute the processing for the reference view on the third time and thereafter.

Figure 9:
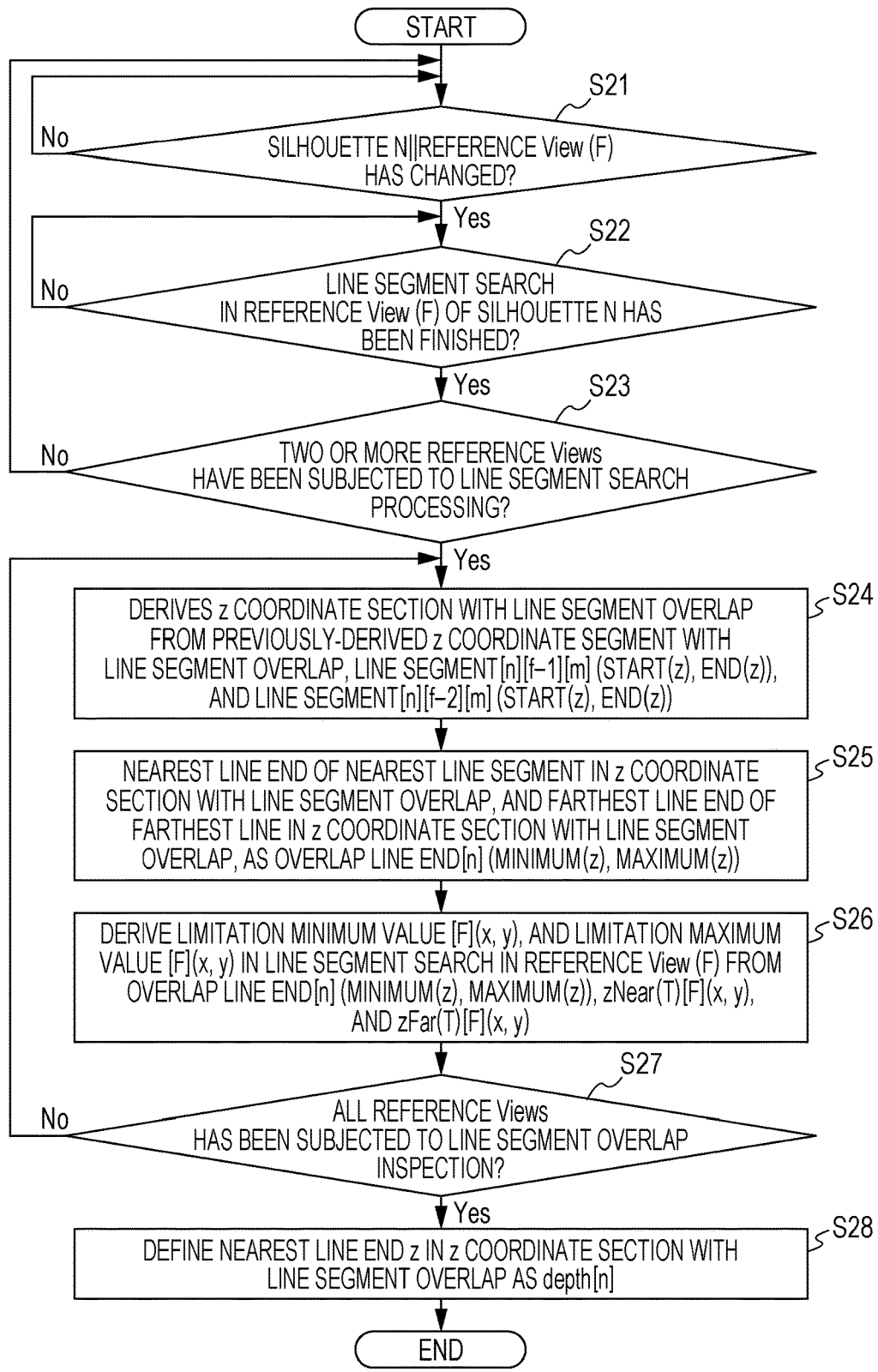
FIG. 9 is a flow chart illustrating of a processing flow of depth determination and line segment search range limitation by a line segment overlap inspection unit and a coordinate transformation unit.

With reference to FIG. 9, the processing executed by the line segment overlap inspection unit 19 and the z coordinate to reference[F] local coordinate transformation unit 16 will be described below with reference to FIG. 7.

FIG. 9 is flow chart illustrating a processing flow of depth determination and line segment search range limitation by the line segment overlap inspection unit and the coordinate transformation unit.

First, the line segment overlap inspection unit 19 determines whether or not silhouette n∥reference view (F) has changed (Step S21). If silhouette n∥reference view (F) has not changed (Step S21; No), the line segment overlap inspection unit 19 repeats the determination in Step S21 regularly or irregularly. Then, if silhouette n∥reference view (F) has changed (Step S21; Yes), the line segment overlap inspection unit 19 determines whether or not line segment search in the reference view (F) of silhouette n has been finished (Step S22). If line segment search has not been finished (Step S22; No), the line segment overlap inspection unit 19 repeats the determination in Step S21 regularly or irregularly. Then, if line segment search in the reference view (F) of silhouette n has been finished (Step S22; Yes), the line segment overlap inspection unit 19 determines whether or not two or more reference views have been subjected to the line segment search processing (Step S23). If two or more reference views have not been subjected to the line segment search processing (Step S23; No), the line segment overlap inspection unit 19 returns to the determination in Step S21. On the contrary, if two or more reference views have been subjected to the line segment search processing (Step S23; Yes), the line segment overlap inspection unit 19 derives the z coordinate segment with a line segment overlap (Step S24). In Step S24, the line segment overlap inspection unit 19 calculates the overlap z coordinate section from the derived z coordinate section with a line segment overlap, line segment[n][f−1][m] (start(z), end(z)), and line segment[n][f−2][m] (start(z), end(z)).

Next, the line segment overlap inspection unit 19 defines the nearest line end of the nearest line segment in the z coordinate section with a line segment overlap, and the farthest line end of the farthest line segment in the z coordinate section with a line segment overlap, as overlap line end[n] (minimum (z), maximum (z)) (Step S25).

Next, the z coordinate to reference[F] local coordinate transformation unit 16 derives a limitation minimum value [F](x, y), and a limitation maximum value[F](x, y) in line segment search in the reference view (F) from overlap line end[n] (minimum (z), maximum (z)), zNear(T)[F](x, y), and zFar(T)[F](x, y) (Step S26).

Then, the line segment overlap inspection unit 19 determines whether or not all reference views have been subjected to the line segment overlap inspection (Step S27). If any unprocessed reference view exists (Step S27; No), the line segment overlap inspection unit 19 repeats the processing in Step S24 and subsequent steps. Then, if all reference views have been processed (Step S27; Yes), the line segment overlap inspection unit 19 defines the nearest line end z in the z coordinate section with a line segment overlap as depth[n] (Step S28), and finishes its processing.

As described above, the visual hull unit 5 according to the present embodiment performs the processing of line segment search, and the processing of depth determination and line segment search range limitation according to changes in the target view, the reference view, and the silhouette pixel n. The visual hull unit 5 executes the processing of setting a particular view among a plurality of views as the target view, and the other views as the reference views, for each of the plurality of views.

The visual hull unit 5 may stop the processing without setting all views as the target view or the reference view according to a required number of overlaps in the line segment overlap inspection. In the line segment overlap inspection, when points located out of the window of the view are considered, a number of overlaps of the line segments equal to or more that a threshold value may be detected in place of detecting all overlaps of the line segments of the views.

The above-mentioned embodiment will be described below in detail. A method of narrowing the line segment search range in the three dimensional shape reconstruction apparatus 1 (information processing apparatus 101) according to the present embodiment is roughly divided into following two types (1) and (2).

(1) The method of cutting down the right and left ends (both ends) of the search range (2) The method of dividing one search range at the area in which the logical AND becomes 0, which exists in the middle of (midpoint) the search range, and cutting down the right and left ends and the divided at the position in the search range Since the method (1) may be deemed as a subset of the method (2), the method (2) will be hereinafter described.

Figure 10A:
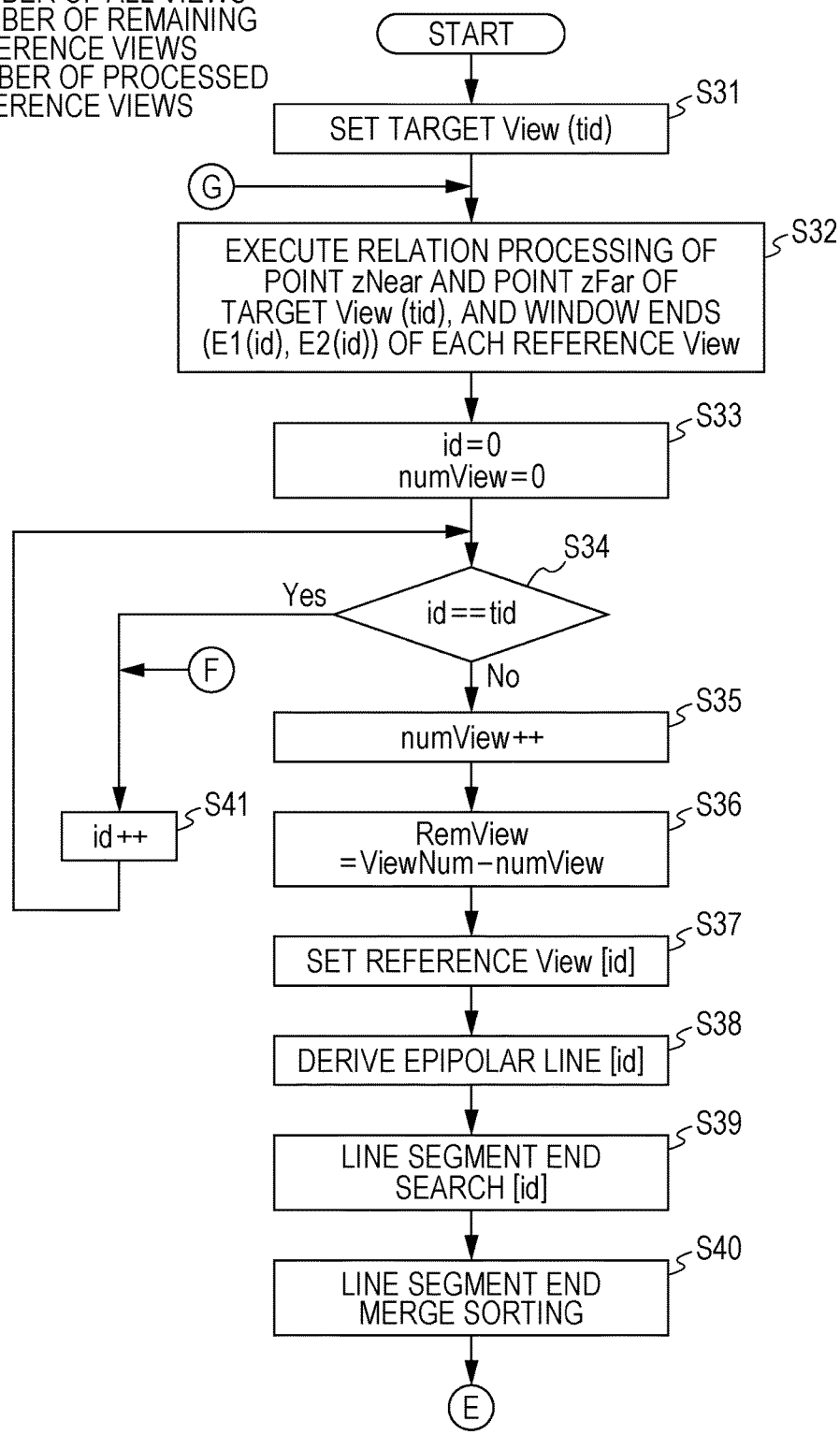
FIG. 10A is a flow chart (1) illustrating a processing flow of visual hull according to the present embodiment.
Figure 10B:
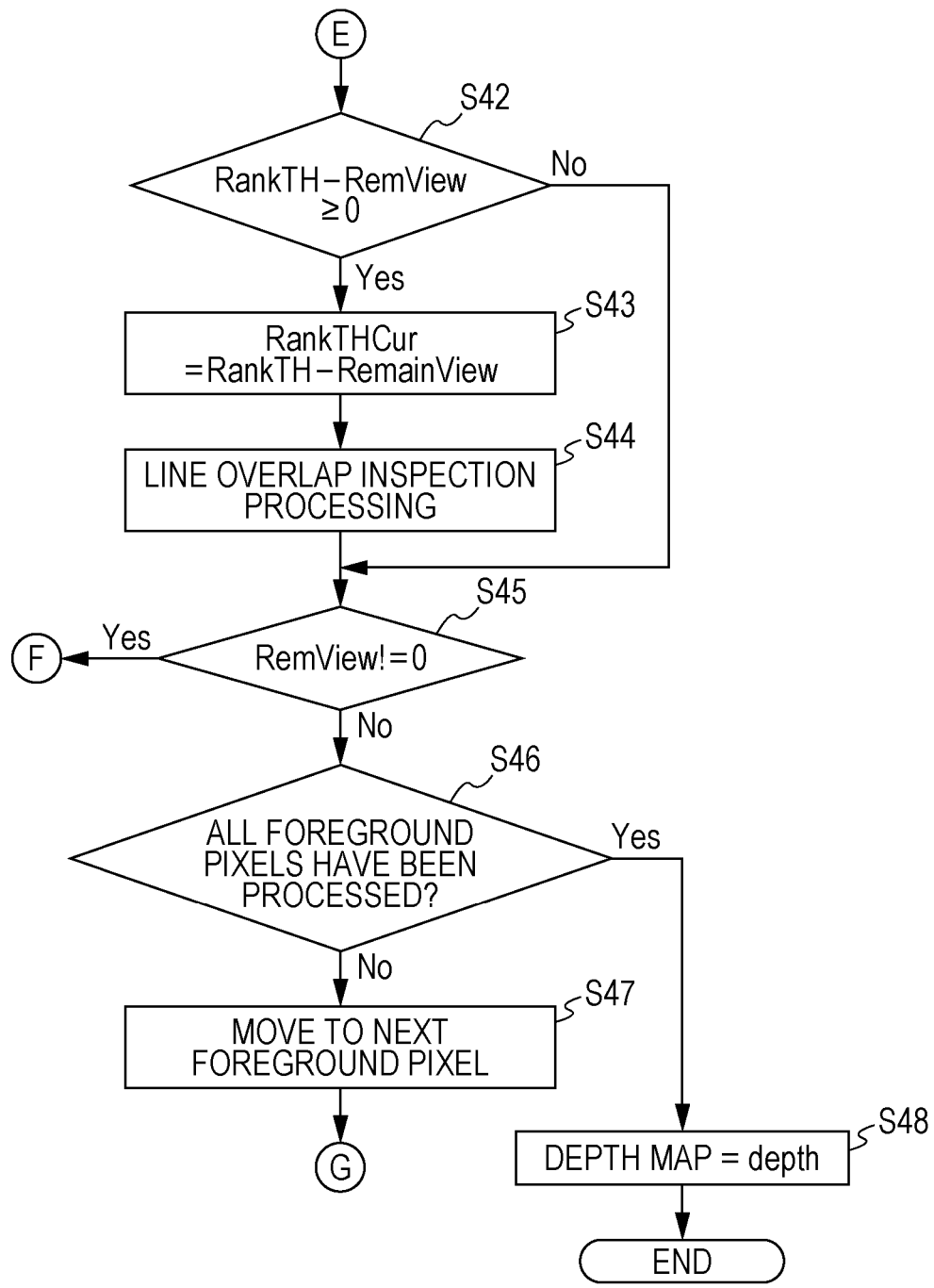
FIG. 10B is a flow chart (2) illustrating a processing flow of visual hull according to the present embodiment.

FIG. 10A is a flow chart (1) illustrating a processing flow of visual hull according to the present embodiment. FIG. 10B is a flow chart (2) illustrating a processing flow of visual hull according to the present embodiment. In the processing flows in FIGS. 10A and 10B, ViewNum denotes a variable indicating the number of all views, RemView denotes a variable indicating the number of remaining reference views, and numView denotes a variable indicating the number of processed reference views.

As illustrated in FIG. 10A, first, the visual hull unit 5 sets the target view (tid) (Step S31).

Next, the visual hull unit 5 executes relation processing of the point zNear and the point zFar of the target view (tid), and the window ends (E1(id), E2(id)) of each reference view (Step S32). Next, the visual hull unit 5 sets 0 to id, and 0 to numView (Step S33).

After Step S33, the visual hull unit 5 compares the value of id with the value of tid (Step S34). If id is equal to tid (Step S34; Yes), the visual hull unit 5 increments id (Step S41), and makes the determination in Step S34 again.

On the contrary, if id is different from tid (Step S34; No), the visual hull unit 5 increments numView (Step S35), and substitutes a value of ViewNum-numView into RemView (Step S36).

Next, the visual hull unit 5 sets reference view[id] (Step S37), and derives epipolar line[id] in the reference view[id] (Step S38). Then, the visual hull unit 5 performs line segment end search[id] (Step S39), and performs line segment end merge sorting (Step S40).

After performing the line segment end merge sorting, as illustrated in FIG. 10B, the visual hull unit 5 determines whether or not RankTH−RemView is equal or greater than 0 (Step S42). If RankTH−RemView is equal or greater than 0 (Step S42; Yes), the visual hull unit 5 substitutes RankTH−RemView into RankTHCur (Step S43), and executes the line segment overlap inspection processing (Step S44). For example, the visual hull unit 5 executes the processing in the flow chart in FIG. 9 as processing in Step S44 (Steps S21 to S28).

After the processing in Steps S43 and S44, the visual hull unit 5 determines whether or not RemView! is 0 (Step S45). If it is determined in Step S42 that RankTH−RemView is less than 0 (Step S42; No), the visual hull unit 5 omits the processing in Steps S43 and S44 and makes determination in Step S45.

If RemView! is 0 (Step S45; Yes), after executing the processing in Step S41 in FIG. 10A, the visual hull unit 5 executes the processing in Step S34 and subsequent steps. On the contrary, if RemView! is not 0 (Step S45; No), the visual hull unit 5 determines whether or not all foreground pixels have been processed (Step S46). If any unprocessed foreground pixel exists (Step S46; No), the visual hull unit 5 moves to a next foreground pixel (Step S47), and executes the processing in Step S32 and subsequent steps. If all foreground pixels have been processed (Step S46; Yes), the visual hull unit 5 substitutes depth into a Depth map (Step S48), and finishes its processing.

Next, a start timing of the line segment overlap inspection processing (Step S42) in the case of executing the processing in the flow charts in FIGS. 10A and 10B as the pipeline processing is described.

FIG. 11 is a view for describing the start timing of the line segment overlap inspection processing in the pipeline processing. The line segment overlap inspection processing is executed if RankTH−RemView is equal to or larger than 0. Line segment end information acquired by line segment end search if RankTH−RemView is smaller than 0 is sorted by line segment end merge sorting, and is stored in a line segment end information storage area.

RankTH is a value for detecting the line segment end of the line segment overlaps by RankTH or more in the line segment overlap inspection, as the surface of the object. In the visual hull, it is ideal to set the value of RankTH to the number of reference views. However, when the camera of the target view may not fall within the field of view of the reference view due to camera installation conditions or the like, or when the accuracy of the silhouette image (mask image) inputted to the visual hull processing is corrected, RankTH may be set to be smaller than the number of reference views. Here, when the pixel to be detected as the silhouette pixel may not be detected at generation of the silhouette image, the accuracy of the silhouette image is deteriorated. For this reason, in the case where the three dimensional shape reconstruction apparatus 1 executes the processing in FIGS. 10A and 10B as the pipeline processing, as illustrated in FIG. 11, the start timing of the merge sorting and the line segment overlap inspection processing becomes RankTH−RemView.

Figure 12:
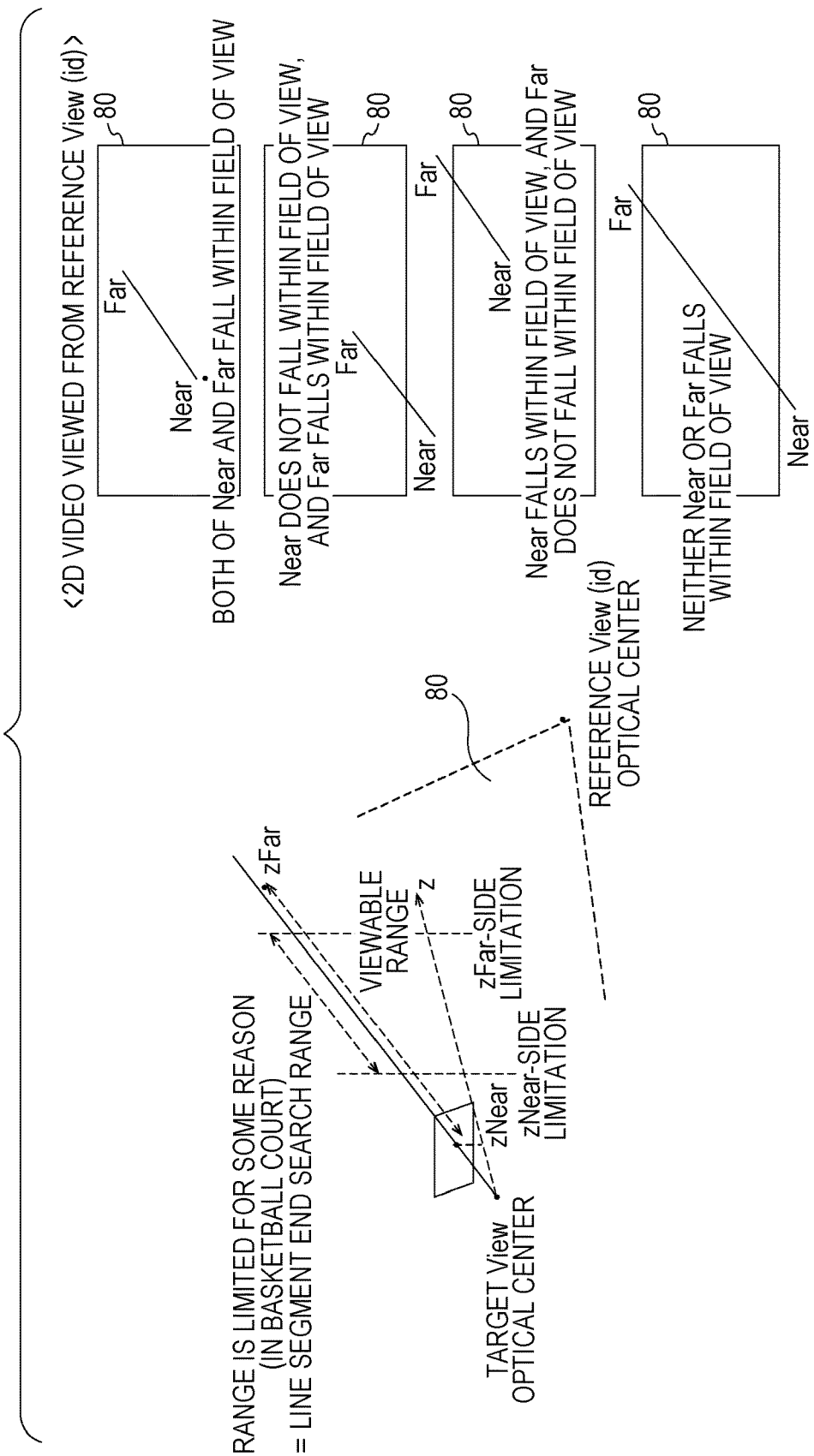
FIG. 12 is a view for describing visual filed, how to view from the reference view, and the line segment end search range according to the present embodiment.

FIG. 12 is a view for describing field of view, how to view from the reference view, and the line segment end search range according to the present embodiment. The processing (line segment search) of searching a silhouette pixel (mask pixel) on the epipolar line for one foreground pixel of the target view is executed to acquire the coordinates x, y of the points of the line segment end from the reference view. The points are transformed into 3D local coordinates of the target view via the 3D (three dimensional) world coordinates. The transformed points are merge-sorted in the sorted line segment end information storage area. At this time, the line the segment end search range viewed from the optical center of the reference view (id) is classified into four patterns illustrated in FIG. 12. In the first pattern, both of the point Near and the point Far fall within a field of view 80. In the second pattern, the point Near does not fall within the field of view 80, and the point Far falls within the field of view 80. In the third pattern, the point Near falls within the field of view 80, and the point Far does not fall within the field of view 80. In the fourth pattern, neither the point Near or the point Far falls within the field of view 80.

Figure 13:
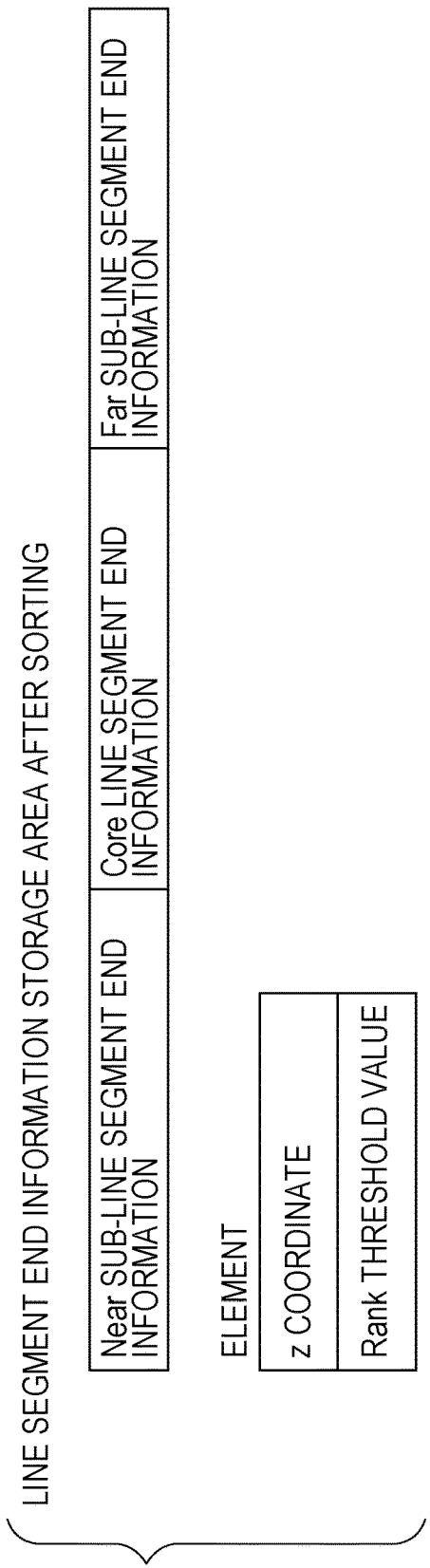
FIG. 13 is a line segment end information storage area after sorting according to the present embodiment.

FIG. 13 is a view for describing the line segment end information storage area after sorting according to the present embodiment. The line segment end information storage area after sorting is implemented as follows. However, any other suitable form may be used according to implementation.

In Near sub-line segment end information, initially, a z coordinate value E1[id].z of the 3D local coordinates of the target view of the window end Ev1[id] that intersects the epipolar line of each view before execution of the processing of each view, and a rank threshold value are stored. Here, as one unit, the line segment end search and line segment end overlap processing of all reference views are applied to a silhouette pixel (mask pixel) of the target view. For the rank threshold value, refer to below-mentioned "relation processing of zNear, zFar of the target view (tid) and window ends (E1(id), E2(id)) of each reference view".

Among intersections (line segment ends) of the epipolar line and the mask pixel of the reference view, which are acquired by line segment search of the reference view, following information is stored in the rank threshold value. That is, z coordinate value of the line segment end transformed into a maximum value maxE1.z of E1[id].z or less at transformation into the 3D local coordinates of the target view, and information indicating whether the line segment end is a start point or an end point of the line segment are stored in the rank threshold value.

In Far sub-line segment end information, initially, a z coordinate value E2[id].z of the 3D local coordinates of the target view of the window end Ev2[id] that intersects the epipolar line of each view before execution of the processing of each view, and a rank threshold value are stored. For the rank threshold value, refer to below-mentioned "relation processing of zNear, zFar of the target view (tid) and window ends (E1(id), E2(id)) of each reference view".

Among intersections (line segment ends) of the epipolar line and the mask pixel of the reference view, which are acquired by line segment search of the reference view, following information is stored in the rank threshold value. That is, z coordinate value of the line segment end transformed into a minimum value minE2.z of E2[id].z or less at transformation into the 3D local coordinates of the target view, and information indicating whether the line segment end is the start point or the end point of the line segment are stored in the rank threshold value.

In Core line segment end information, a z coordinate value transformed into the 3D local coordinates of the target view of intersections (line segment ends) of the epipolar line and the mask pixel of the reference view, which are acquired by line segment search of the reference view other than the above-mentioned reference view, and information indicating whether the line segment end is the start point or the end point of the line segment are stored in the rank threshold value.

If Near.z is equal to or larger than maxE1.z, the number of elements of the Near sub-line segment end information becomes 0. If Far.z is equal to or smaller than minE2.z, the number of elements of the Near sub-line segment end information becomes 0.

Here, the values stored in the rank threshold value are set as follows. This enables the current rank value at the division point at division of the area to be kept. It is a matter of implementation, and any other method may be selected according to implementation.

start point: −(2*RankTH)

end point end point: −(2*RankTH+1)

start point+Rank storage: −(2*Rank)

end point+Rank storage: −(2*Rank+1)

In this case, based on the sign, it is possible to distinguish whether the point stored in the element is the start point or end point (in this case, negative sign), or the window boundary point (in this case, the positive sign). Since the current rank value at the division point does not exceed RankTH, an absolute value of a negative value/2 is equal to or larger than RankTH, the start point or end point is stored, and if the absolute value of the negative value/2 is smaller than RankTH, start point+Rank or end point+Rank is stored. If the absolute value of the negative value is an even number, the start point is stored, and if the absolute value of the negative value is an odd number, the end point is stored.

Next, the relation processing of zNear, zFar of the target view (tid) and the window ends (Ev1(id), Ev2(id)) of each reference view (Step S32) is described.

Figure 14:
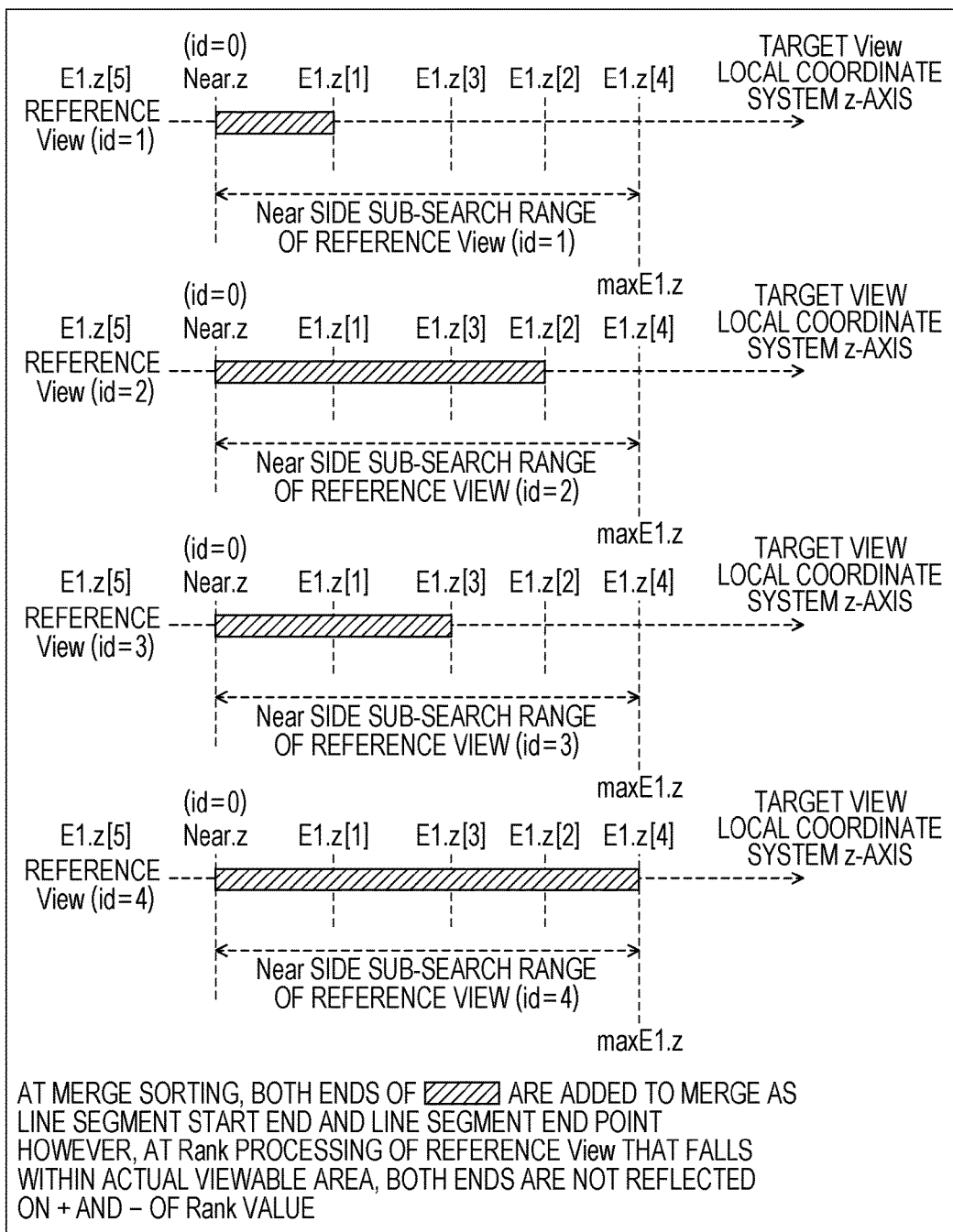
FIG. 14 is a view for describing relation of the window ends according to the present embodiment.

FIG. 14 is a view relation illustration the relation of the window ends according to the present embodiment. In the 3D (three dimensional) local coordinate system of the target view, out of points acquired by mapping the window ends of each reference view onto the 3D local coordinate system of the target view, the point on the side of zNear.z is defined as E1.z[id], and the point on the side of zFar.z is defined as E2.z[id]. Here, a shaded section of each coordinate system in FIG. 14 are out of the window in the line segment end search of concerned reference view and thus, line segment end search is not performed.

According to the present embodiment, maximum values maxE1.z of E1.z[id] of all reference views are previously found, and the range from Near.z=max (zNear.z, zNear-side limitation) to maxE1.z is defined as a Near sub-range. Similarly, according to the present embodiment, for zFar.z-side, minimum values minE2.z of E2.z[id] of all reference views are previously found, and the range from minE2.z to Far.z=min (zFar.z, zFar-side limitation) is defined as a Far sub-range.

Given that one line segment exists in the shaded section for all reference views, in the Near sub-range, E1.z[id] of all reference views are previously sorted, and stored in a Near sub-line segment end information area. Similarly, in the Far sub-range, E2.z[id] of all reference views are previously sorted, and stored in a Far sub-line segment end information area. At this time, points that are equal to or smaller than zNear.z are not stored. In the case of the same E1.z[id], only one element of the E1.z[id] itself is stored, and the overlap level has a number corresponding to the overlaps of the shaded sections in FIG. 14.

Overlap number information on the shaded section from the concerned E1.z[id] to E1.z[id] on the adjacent zFar side is added to the zNear, E1.z[id] storage element. Similarly, overlap number information on the shaded section from the concerned E2.z[id] to E2.z[id] on the adjacent zNear side is added to the zFar, E2.z[id] storage element (FIG. 15).

FIG. 15 is a view for describing the Near sub-line segment end information area according to the present embodiment. Hereinafter, the Near-side Near sub-line segment information storage area is described and however, the same also applies to the Far-side Far sub-line segment.

As illustrated in FIG. 15, the rank threshold value RankTH' of each section is defined. That is, the nearest point to zNear that satisfies RankTH' in each section is an edge to be found.

At line segment search of each reference view, found line segment end information and Near sub-line segment end information are merged and sorted. Each of the found line segment end information and Near sub-line segment end information are aligned in ascending order from zNear.z to zFar.z. The found line segment end information is distinguished from the point of the window end, and further, the line segment start point and the line segmented point of the found line segment end information are distinguished from each other (for example, put start point −1 and end point −2 to the overlap level). The number of elements of the Near sub-line segment end information after merge sorting following line segment search of the reference view (id) becomes Near sub-line segment end information+the number of line segment start points(id)+the number of line segment end points(id) before merge sorting.

Figures 16A, 16B:
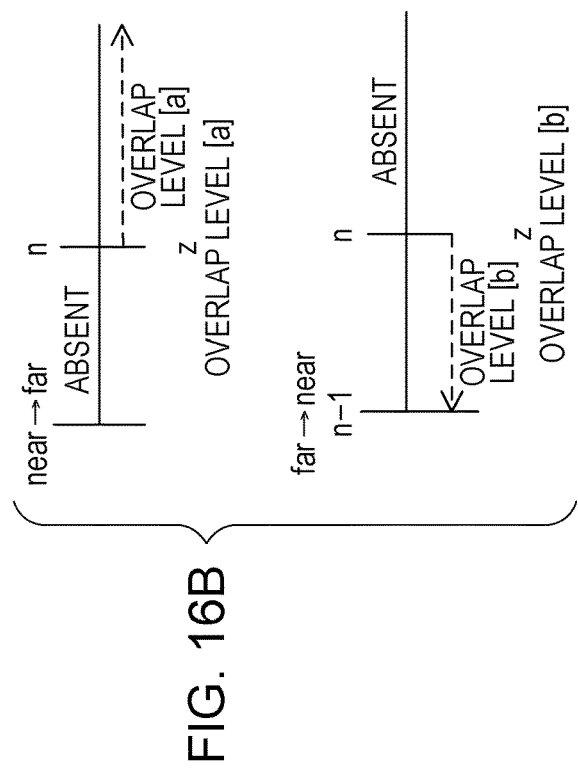
FIGS. 16A and 16B are views for describing the Near sub-line segment end information area, and a method of providing an overlap level for a near side to a far side and an overlap level for the far side to the near side according to the present embodiment.

The line segment overlap inspection unit 19 inspects each area from the near-side to the far-side in the line segment overlap inspection processing, and stops its processing when conditions are satisfied. In the case where each area is inspected from the near-side to the far-side to narrow the range of End in line segment search, according to implementation, for example, the overlap level for the near side to the far side and the overlap level for the far-side to the near-side may be provided (see FIGS. 16A to 17). Here, FIGS. 16A and 16B are views for describing the Near sub-line segment end information area and the method of providing the overlap level for the near side to the far side and the overlap level for the far-side to the near-side according to the present embodiment.

In the line segment overlap inspection processing executed by the line segment overlap inspection unit 19, even when each area is inspected from the near-side to the far-side and satisfies conditions, all areas are inspected without stopping the processing to narrow the range of End.

Next, the line segment overlap inspection processing is briefly described. After the relation processing of the point zNear, point zFar of the target view (tid) and the window ends (Ev1(id), Ev2(id)) of each reference view is executed, a rank threshold value RankTH' is stored. That is, the rank threshold value RankTH' in consideration of the overlap of the z coordinate transformed into the 3D local coordinates of the target view of the screed ends of each reference view, and the section assumed to have the line segment without performing line segment search are stored in the Near sub-line segment end information storage area and the Far sub-line segment end information storage area.

Each time line segment search is performed, the result of line segment search is transformed into the 3D local coordinates of the target view in the above-mentioned area to fine z coordinate, and merging and sorting is performed. At this time, a start index and an end index of each area are updated according to the number of pieces of inputted data.

The line segment overlap inspection unit 19 starts its operation (line segment overlap inspection processing) when line segment search of two views is finished and then, as the number of views for line segment search increases, performs the merging and sorting and the line segment overlap inspection processing.

In the line segment overlap inspection processing, the z coordinate of the intersection of the nearest mask pixel from the zNear side is found, and the z coordinate becomes the distance to the concerned pixel viewed from the target view. To find only the distance to the surface of the object viewed from the target view, the line segment overlap inspection processing may be stopped at this stage, and the overlap level may be inspected for all existing line segments. To improve the separation accuracy of the object, when a few points (for example, up to three points) from the surface are found, the processing is stopped start point—end point—start point. In this case, the distance to the surface when viewed from the target view, the distance during which the object enters into the surface and leaves the surface, and the distance to the surface of the next object located in the rear of the first object may be found.

It is unnecessary to execute the line segment overlap inspection processing for points other than the requested points. The operation amount may be reduced by omitting the unnecessary processing.

According to the present embodiment, to omit the unnecessary processing, following information is limited as the reference view is processed.

the line segment search start point (LSMin[0]) and the line segment search end point (LSMax[0]) in the Near sub-line segment end information storage area the line segment search start point (LSMin[1]) and the line segment search end point (LSMax[1]) in the Core line segment end information storage area the line segment search start point (LSMin[2]) and the line segment search end point (LSMax[2]) in the Far sub-line segment end information storage area LSMin[Z], LSMax[Z] (Z=0, 1, 2) is z coordinates of the 3D coordinates of the target view. In the line segment overlap inspection processing, the z coordinates are projected onto the concerned epipolar line of line segment search from (x, y, z) of the 3D coordinates of the target view to the world three dimensional coordinates and to the 2D (two-dimensional) coordinates of the reference view, in the opposite direction to the projection direction of the line segment end information.

Figure 17:
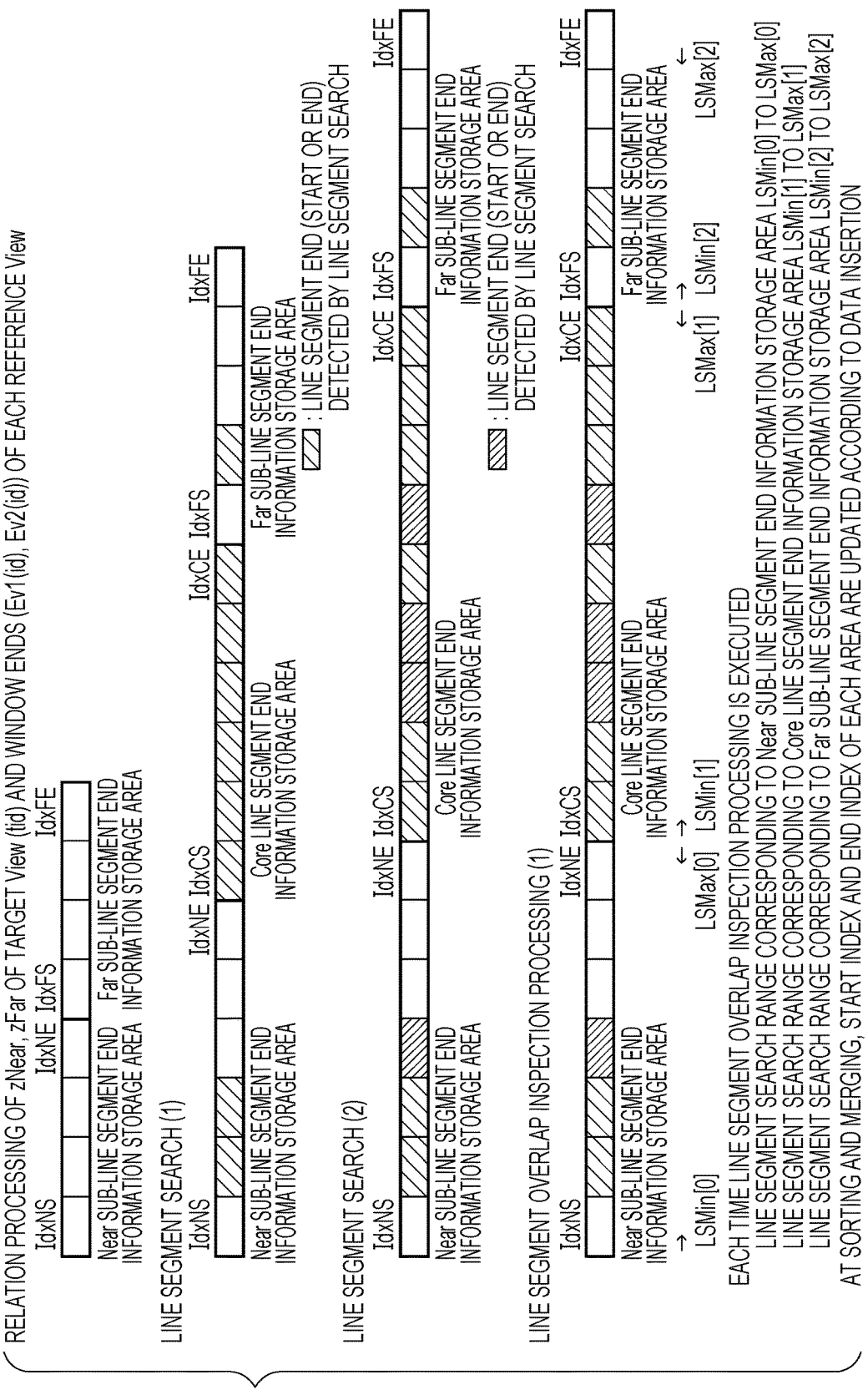
FIG. 17 is a view for describing relation processing of zNear, zFar of target view (tid) and window ends (Ev1(id), Ev2(id)) of each reference view according to the present embodiment.

FIG. 17 is a view for describing the relation processing of zNear, zFar of the target view (tid) and window ends (Ev1(id), Ev2(id)) of each reference view according to the present embodiment.

In the visual hull according to the present embodiment, each time the line segment overlap inspection processing is executed following at sorting and merging line segment search range LSMin[0] to LSMax[0] corresponding to the Near sub-line segment end information storage area line segment search range LSMin[1] to LSMax[1] corresponding to the Core line segment end information storage area line segment search range LSMin[2] to LSMax[2] corresponding to the Far sub-line segment end information storage area.

Then, a start index and an end index of each area are updated according to the number of pieces of inputted.

Figure 18:
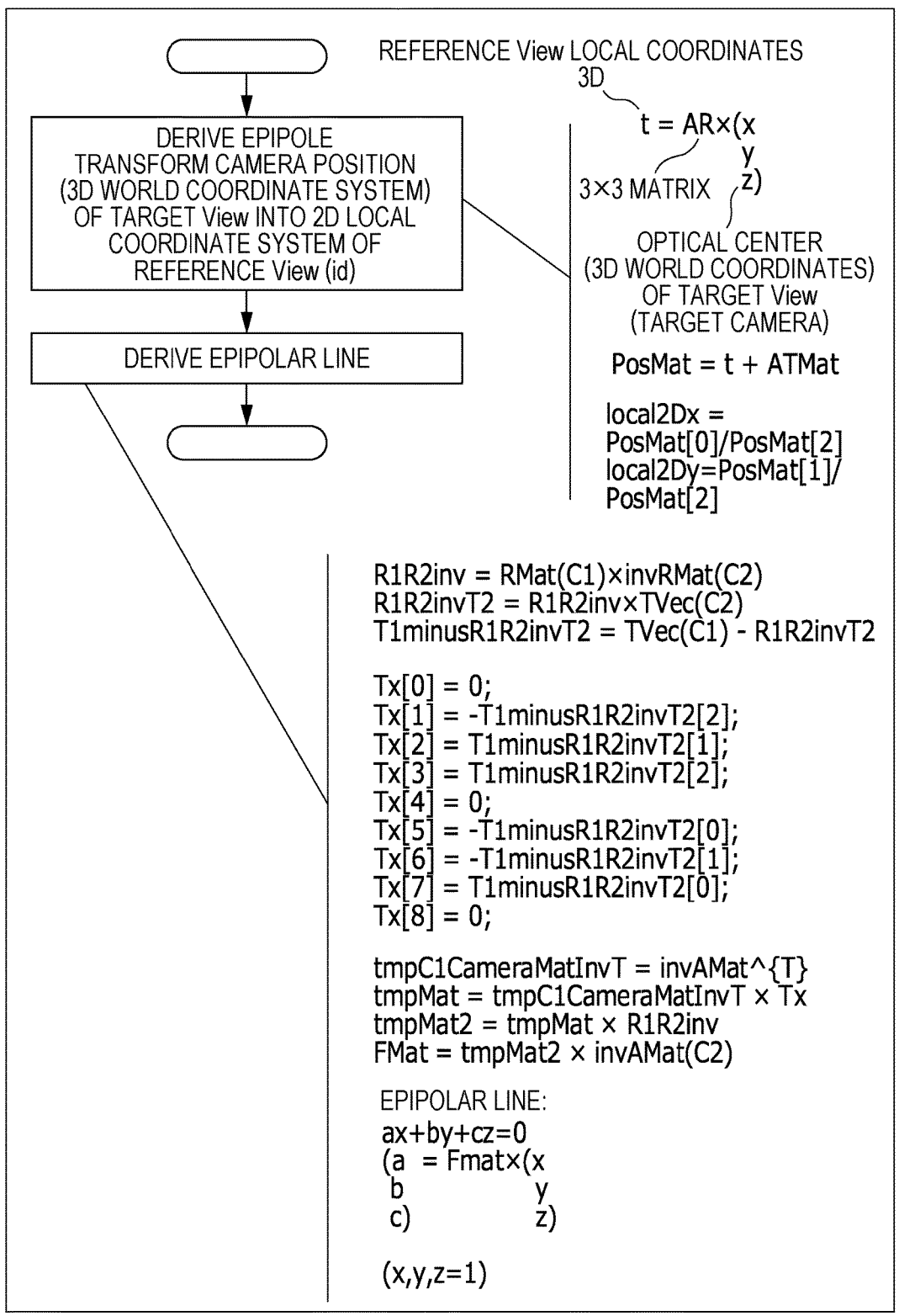
FIG. 18 is a view for describing of a method of deriving an epipolar line on 2D coordinates of the reference view according to the present embodiment.

Next, a coordinate transformation-related matrix is described. The coordinate transformation-related matrix uses following.

rotation matrix (3×3)$R$Mat translation vector (1×3)$T$Vec camera inside parameter (3×3)$A$Mat $AR\text{Mat}=A\text{Mat}*R\text{Mat}$ $AT\text{Mat}=A\text{Mat}*T\text{Vec}$ $\text{inv}RT\text{Mat}=R\text{Mat}^{-1}\times T\text{Vec}$ $\text{inv}R\text{Matinv}A\text{Mat}=R\text{Mat}^{-1}\times A\text{Mat}^{-1}$ Next, a method of deriving the epipolar line in the 2D coordinates of the reference view is described. FIG. 18 is a view for describing of a method of deriving an epipolar line on 2D coordinates of the reference view according to the present embodiment.

To derive the epipolar line, as illustrated in FIG. 18, the visual hull unit 5 first transforms the camera position (3D world coordinate system) of the target view into the 2D local coordinate system of the reference view (id). Then, the visual hull unit 5 derives the epipolar line based on the position of the epipole on the projection plane of the reference view (id), the camera position of the target view, and the position of the silhouette on the projection plane. At this time, for example, the visual hull unit 5 derives the epipolar line according to the algorithm illustrated in FIG. 18.

Next, a method of transforming (x, y) coordinates in the 2D coordinates of the reference view into the 3D coordinates of the target view is described.

Figure 19:
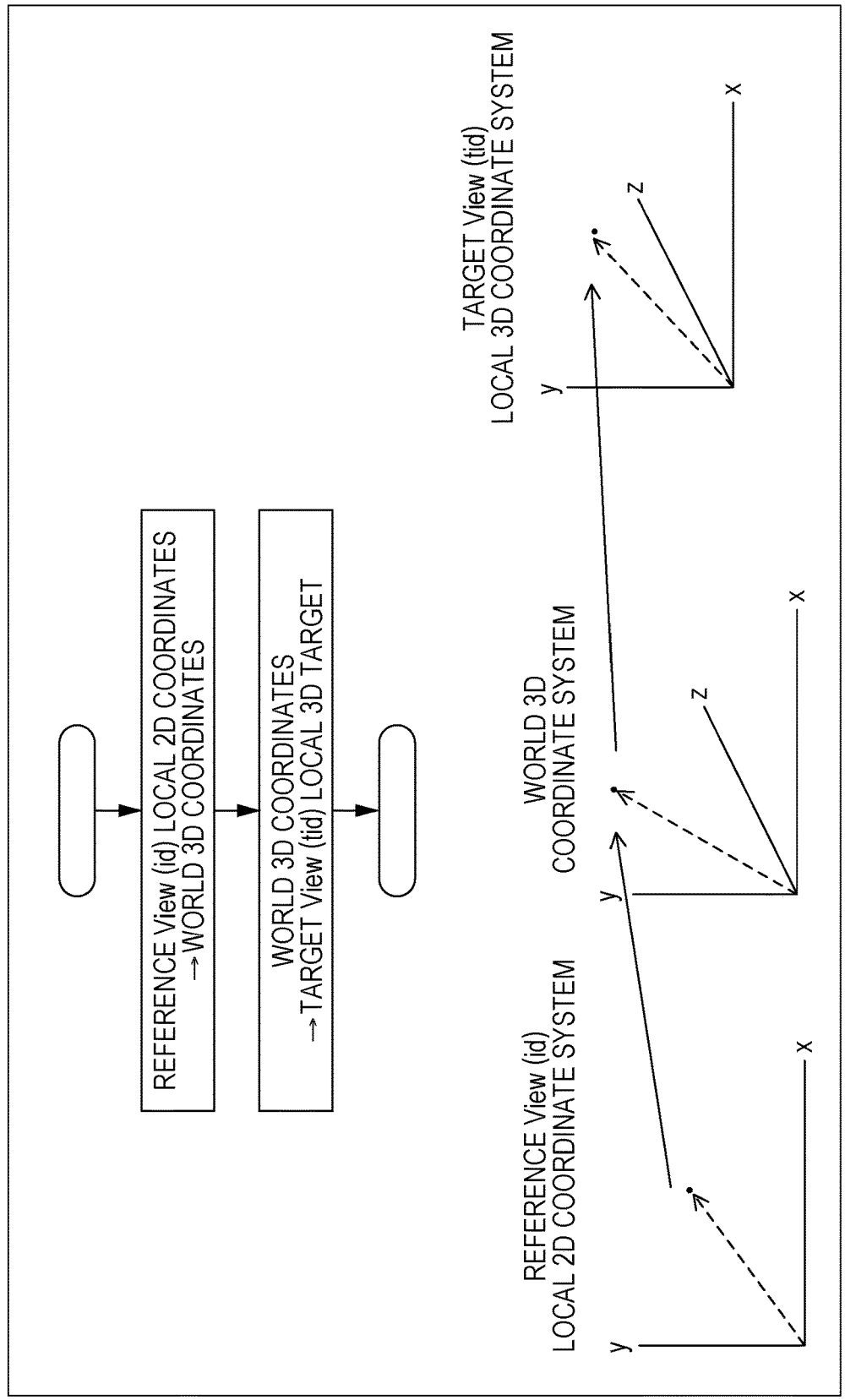
FIG. 19 is a view for describing a method of transforming (x, y) coordinates of 2D coordinates of the reference view into 3D coordinates of the target view according to the present embodiment.

FIG. 19 is a view for describing the method of transforming the (x, y) coordinates of the 2D coordinates of the reference view into the 3D coordinates of the target view according to the present embodiment.

The processing of transforming the (x, y) coordinates of the 2D coordinates of the reference view into the 3D coordinates of the target view is an inverse of the processing of transforming the 3D coordinates of the target view into the (x, y) coordinates of the 2D coordinates of the reference view. That is, in the processing of transforming the (x, y) coordinates of the 2D coordinates of the reference view into the 3D coordinates of the target view, as illustrated in FIG. 19, first, the (x, y) coordinates of the 2D coordinates of the reference view are transformed into the world 3D coordinates. Then, the world 3D coordinates are transformed into the local 3D coordinates of the target view (tid).

For example, the 3D world coordinate is transformed into the local 2D coordinates using a below-mention algorithm.

($t0=AR\text{Mat}\times(\text{world3}Dx t1\ \text{world3}Dy t2)\text{world3}Dz$)
  Pos0=$t0+AT\text{Mat}[0]$Pos1=$t1+AT\text{Mat}[1]$Pos2=$t2+$
  $AT\text{Mat}[2]$Pos2!=0. In the case of 0, scaling to
  z=1 local2$Dx$=Pos0/Pos2local2$Dy$=Pos1/Pos2

Pos2=0. In the case of 0, local2Dx= infinitelocal2Dy=infinitePos2>=0 point is located in front of window Pos2<0 point is located in front of window In this case, an algorithm for transforming the local 2D coordinates into the world 3D coordinates is as following.

($t0=\text{inv}R\text{inv}A\text{Mat}\times(\text{local2}Dx\times st1\ \text{local2}Dy\times st2)s$)
  (world3$Dx$=($t0-\text{inv}RT\text{Mat}$world3$Dy\ t1$world3$Dz$ $t2)s$=1 (3D world coordinates to 2D projection coordinates (local 2D coordinates), scaling to z=1)

Further, an algorithm for transforming world 3D coordinates into 3D coordinates (local 3D coordinates) of the target view is as follows.

($t0=R\text{Mat}\times(\text{world3}Dx t1\ \text{world3}Dy t2)\text{world3}Dz$)
  (local3$Dx$=($t0+T\text{Vec}$local3$Dy\ t1$local3$Dz\ t2$)

The above-described algorithm is an example of the algorithm for transforming (x, y) coordinates of the 2D coordinates of the reference view into the 3D coordinates of the target view. The coordinate transformation algorithm may be appropriately changed.

Figure 20:
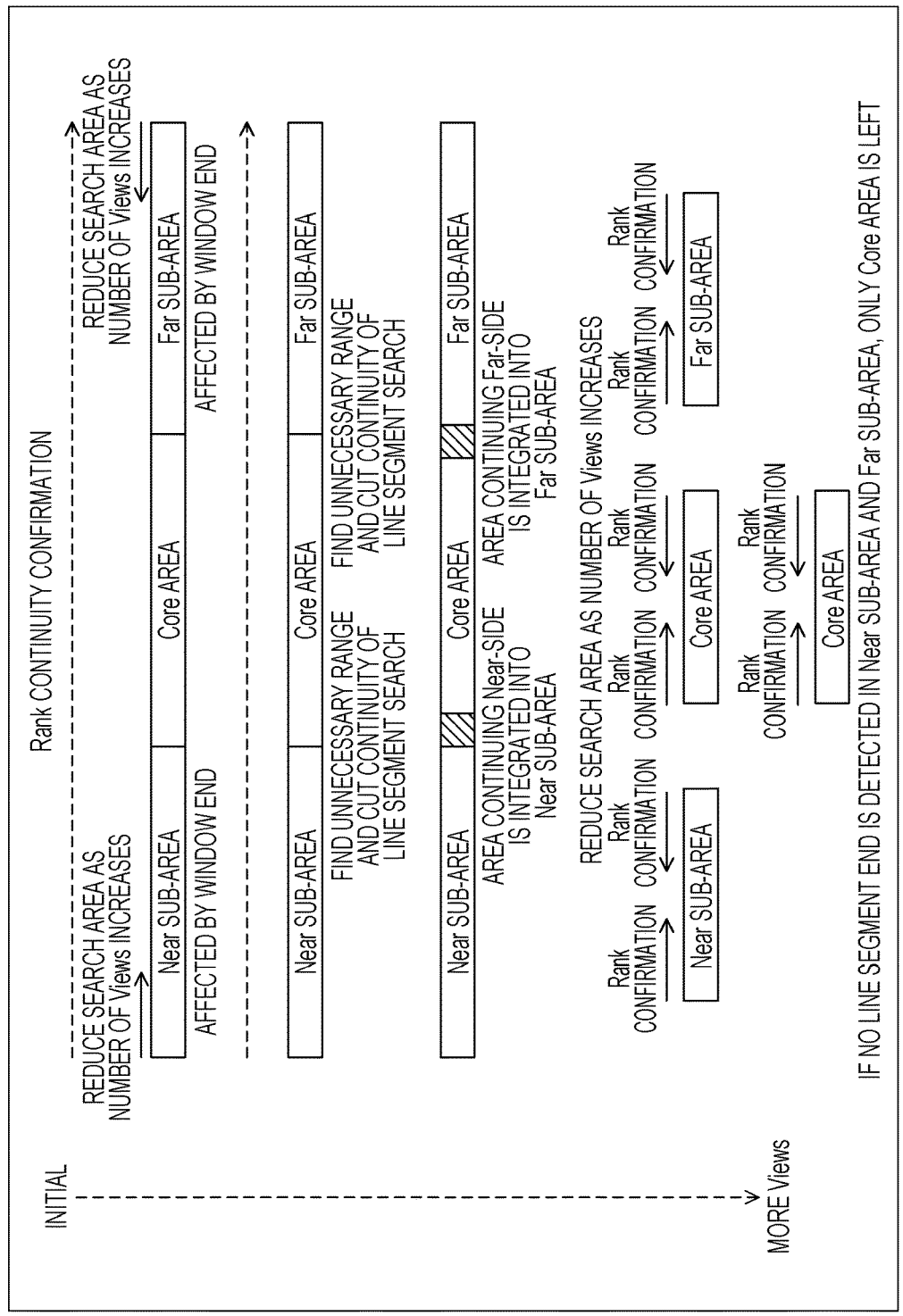
FIG. 20 is a view for describing line segment end overlap inspection processing according to the present embodiment.

Next, the line segment end overlap inspection processing is described. FIG. 20 is a view for describing the line segment end overlap inspection processing according to the present embodiment.

"Initial" in FIG. 20 corresponds to the start of the line segment end overlap inspection processing. In the initial stage of the line segment end overlap processing, as illustrated in FIG. 20, the continuity of Rank exists between a Near sub-area, a Core area, and a Far sub-area. In this case, the range of line segment search may be cut off only from Near-side of Near sub and Far-side of Far sub.

When proceeding the processing to increase the view, the line segment overlap inspection unit 19 finds the unnecessary line segment end search range that is nearest to the Near-side in the Core area between the Near sub-area and the Core area, and the unnecessary line segment end search range that is nearest to the Far-side in the Core area between the Core area and the Far sub-area. When finding the unnecessary line segment end search range, the line segment overlap inspection unit 19 may confirm Rank using the range as a base point, cutting off the range of the line segment search.

Figure 21:
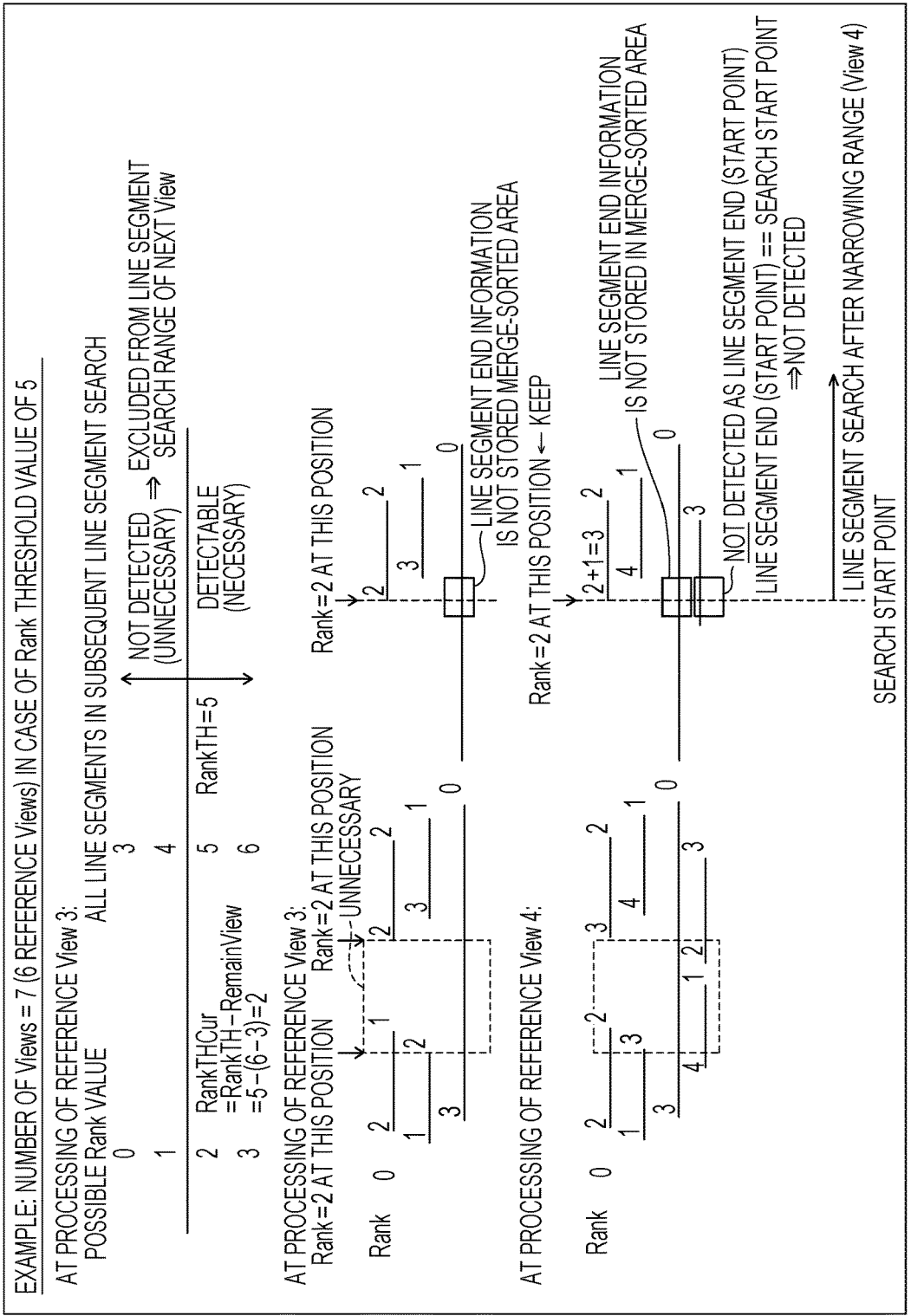
FIG. 21 is a view for describing an unnecessary line segment end search range according to the present embodiment.

FIG. 21 is a view for describing an unnecessary line segment end search range according to the present embodiment. FIG. 21 illustrates an example of selection of a division position of the Sub area and the Core area. After the reference view is added at this position and the unnecessary line segment end search range is detected, even if the line segment exists in all reference views, the overlap level of the line segment does not finally exceed RankTH and thus, the line segment is not detected.

Unless complicated implementation is not considered, each time Rank discontinuous section in each area is detected, the area is divided, and as the view increases, the range of line segment end search may be narrowed.

Figure 22B:
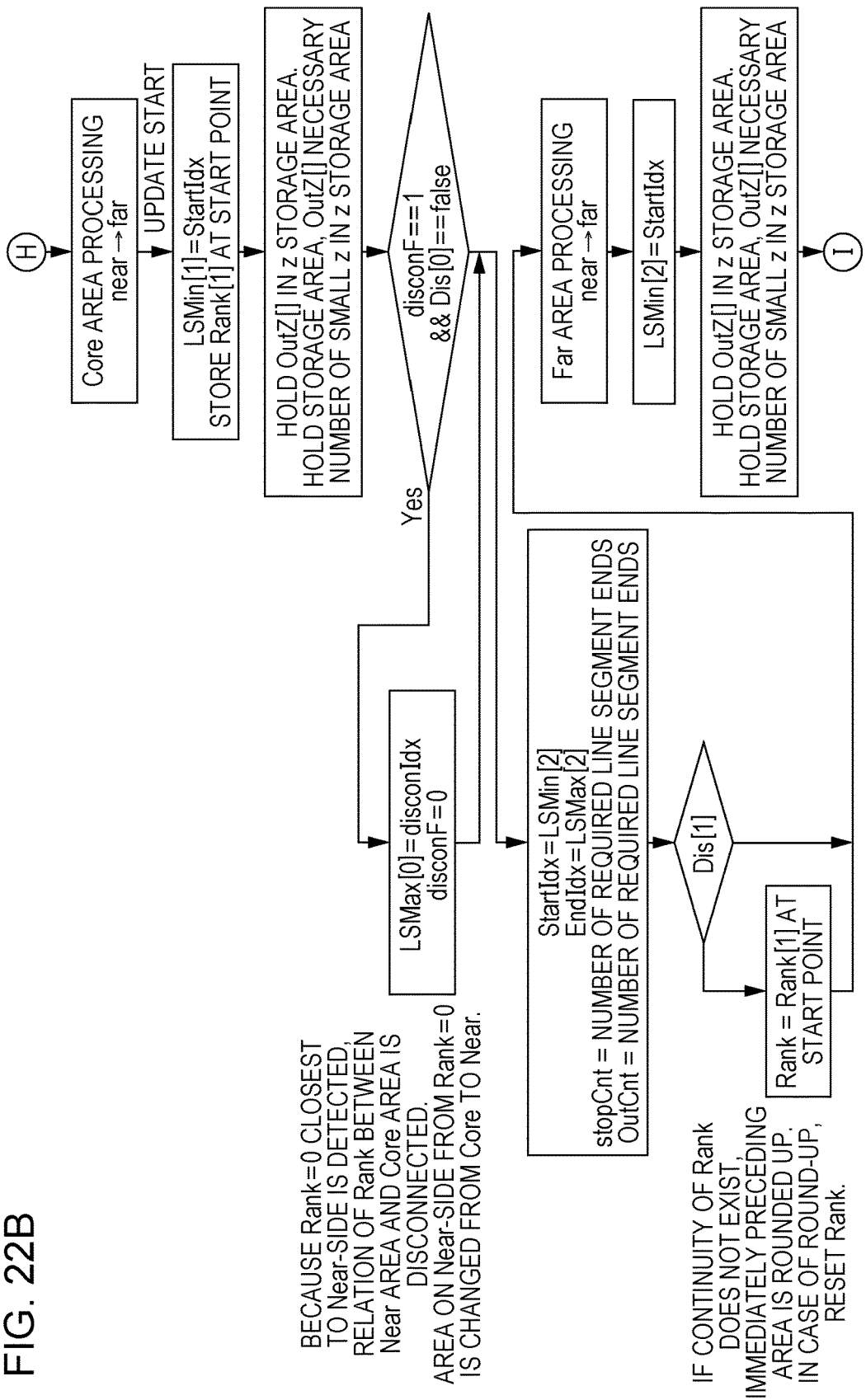
Figure 23A:
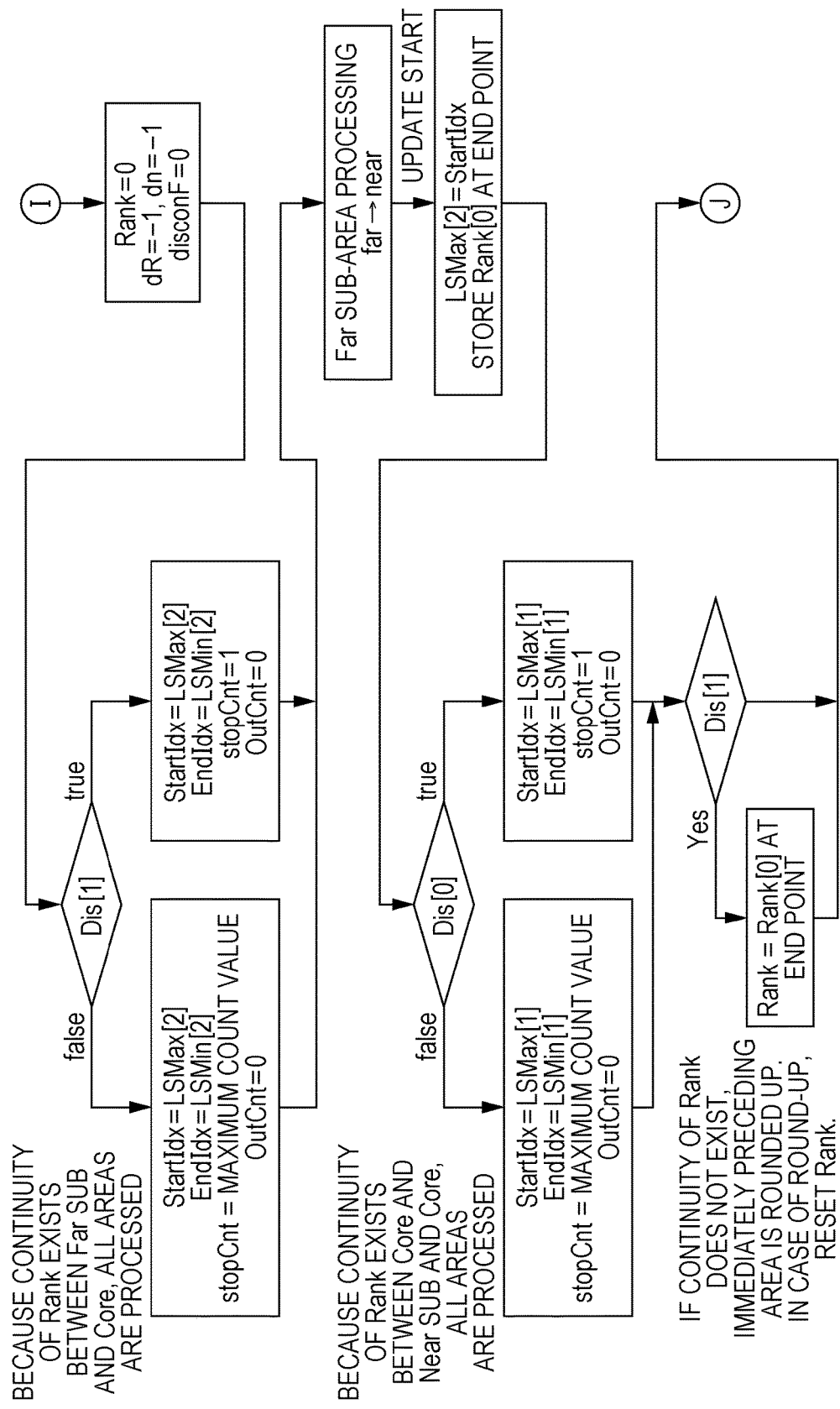
FIGS. 23A and 23B are views for describing contents of processing of performing the line segment overlap inspection processing from the far side to the near side.
Figure 23B:
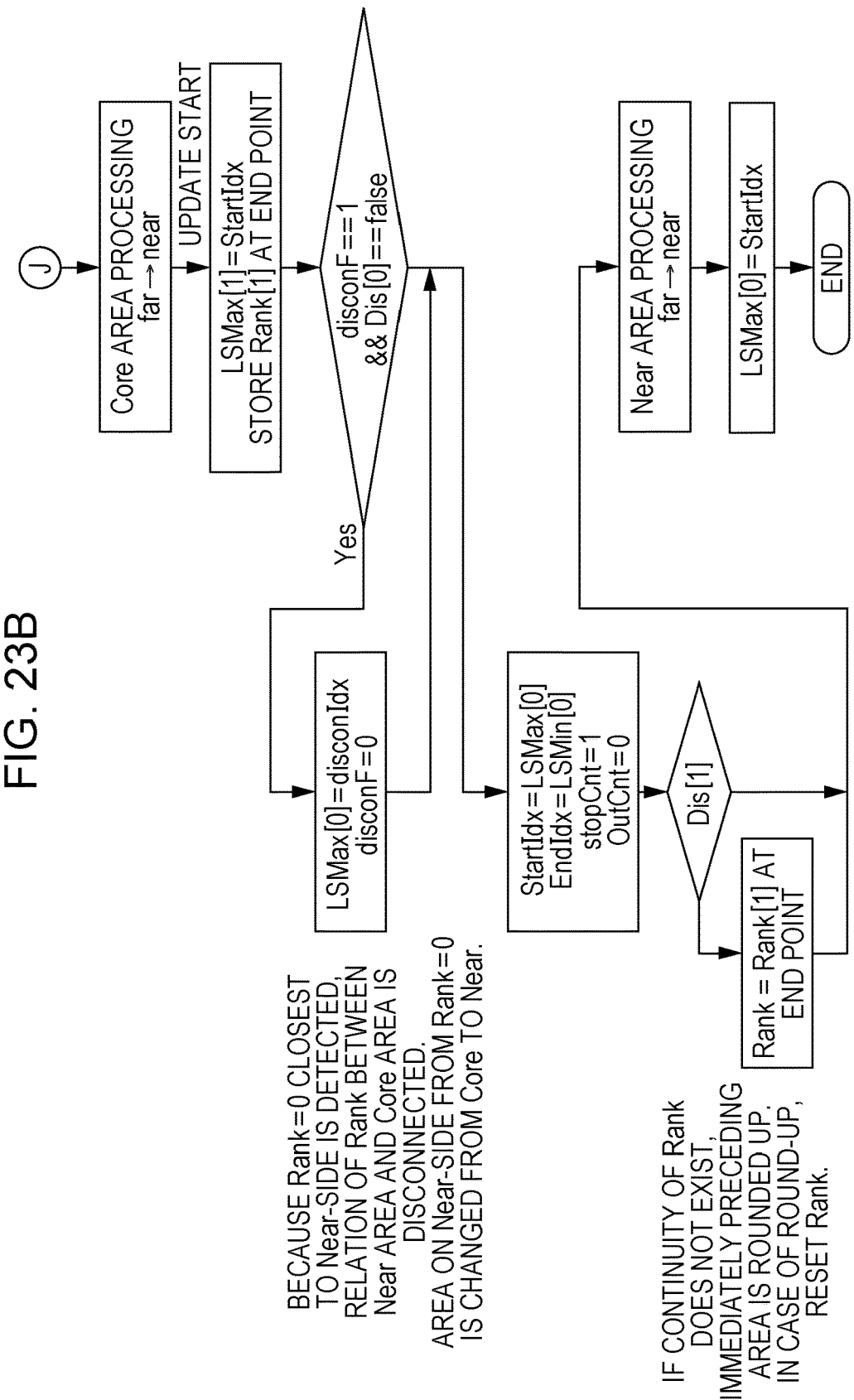

FIGS. 22A and 22B are views for describing contents of processing of performing the line segment overlap inspection processing from the near-side to the far-side. FIGS. 23A and 23B are views for describing contents of processing of performing the line segment overlap inspection processing from the far-side to the near-side.

In the visual hull processing according to the present embodiment, by executing the processing in the flow charts in FIGS. 22A and 22B, the range in each area on the near-side may be narrowed. In the processing from the near-side to the far-side in FIGS. 22A and 22B, Rank is incremented by 1 at the line segment start point, and is decremented by 1 at the line segment end point. Here, the rank of the start point is a rank value on the nearest side (line segment end search start point) in the range in the line segment end search from the near-side to the far-side.

In the visual hull processing according to the present embodiment, by executing the processing in the flow charts in FIGS. 23A and 23B, the range on the far-side in each area may be cut off. In the processing from the far-side to the near-side in FIGS. 23A and 23B, Rank is decremented by 1 at the line segment start point, and is incremented by 1 at the line segment end point. Here, the rank of the end point is a rank value on the farthest side (line segment end search end point) in the range in the line segment end search from the near-side to the far-side.

stopCnt in the processing flow charts in FIGS. 22A to 23B controls the number of line segment ends that satisfy Rank, which are searched in the line segment overlap inspection processing. If the unnecessary line segment end search range is not determined, it is required to inspect all line segment ends. If the unnecessary line segment end search range is determined, the processing may be ended when the required number of surface positions (z coordinate values) are found. outCnt is the number of outputted z coordinate values. stopCnt and outCnt may be set to processing in each of the Near sub-area, the Core area, and the Far sub-area in consideration of the number of requested surface positions for the processing.

In the case where the processing according to the processing flow charts in FIGS. 22A and 22B and the processing according to the processing flow charts in FIGS. 23A and 23B are continuously executed, the order of the processing is not specifically limited. That is, the processing executed from the far-side to the near-side may be performed after the processing executed from the near-side to the far-side. In an opposite way, the processing executed from the near-side to the far-side may be performed after the processing executed from the far-side to the near-side.

Figure 24:
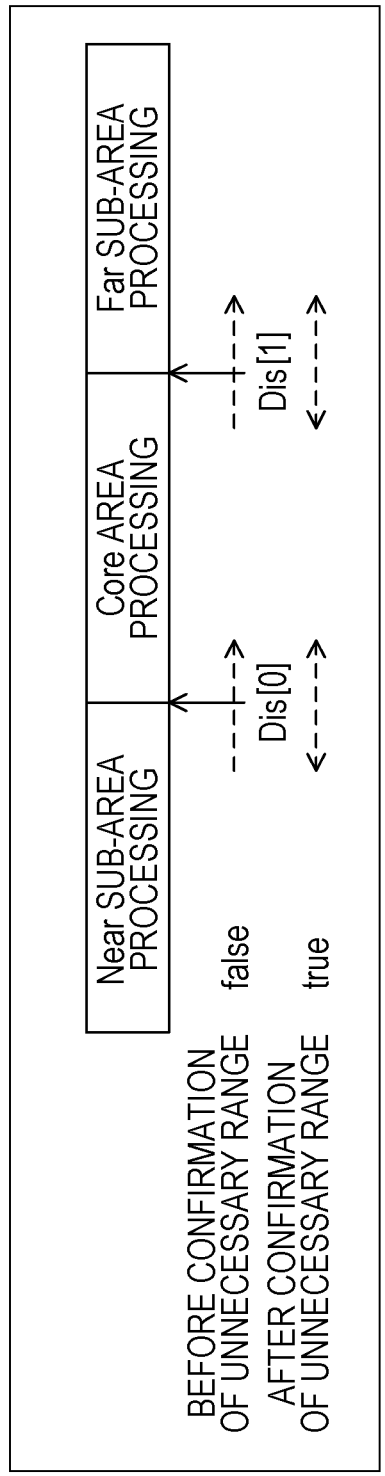
FIG. 24 is a view for describing Near sub-area processing, Core area processing, and Far sub-area processing according to the present embodiment.
Figure 25B:
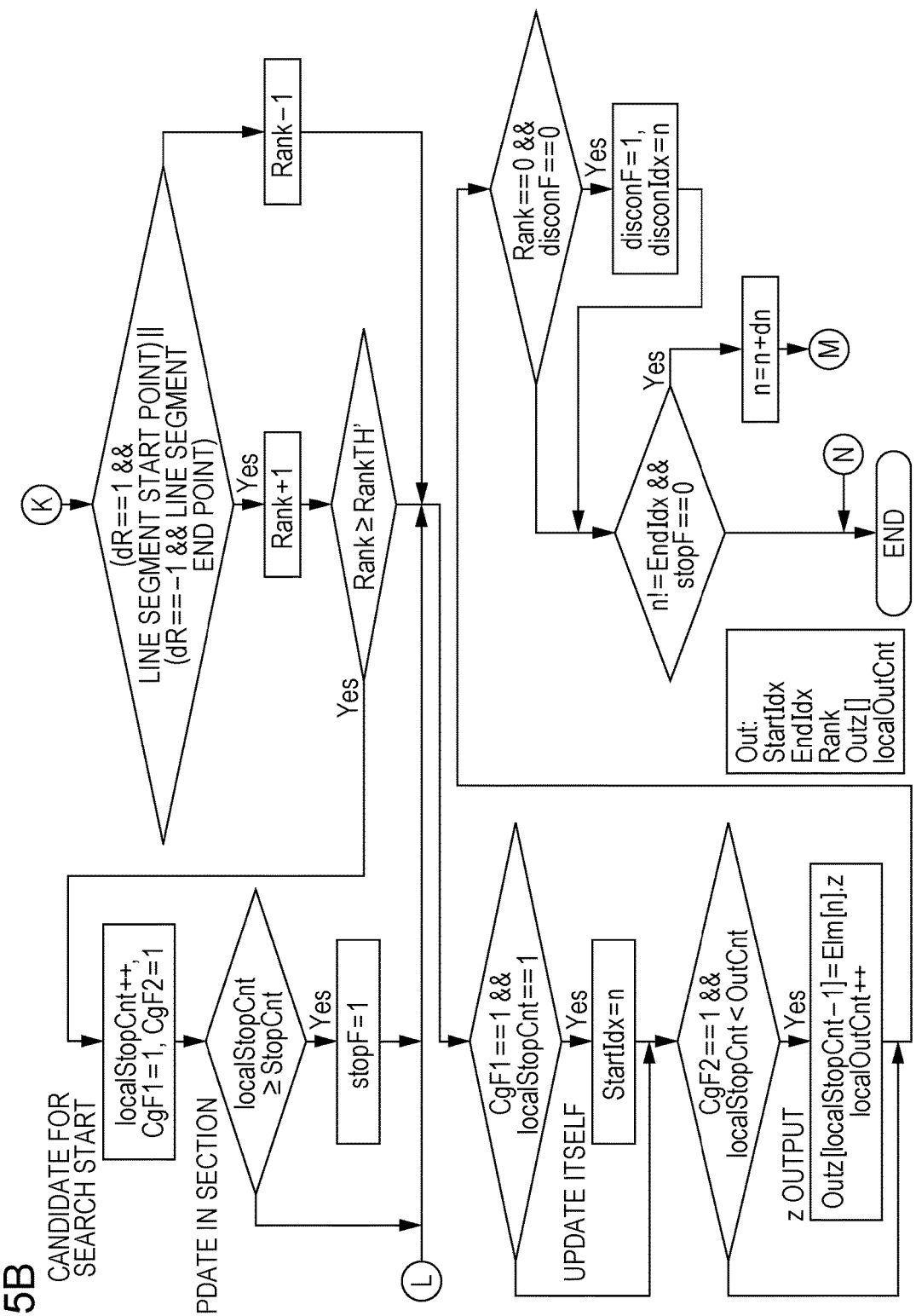

FIG. 24 is a view for describing Near sub-area processing, Core area processing, and Far sub-area processing according to the present embodiment. FIGS. 25A and 25B are flow charts illustrating a flow of the Near sub-area processing, the Core area processing, and the Far sub-area processing in FIGS. 22A to 23B. A branch on the left side of Elm[n]. overlap level [a] 0 in FIGS. 25A and 25B is used only in the processing of the area including window end information. The core area processing is basically, a right branched processing.

Figure 26:
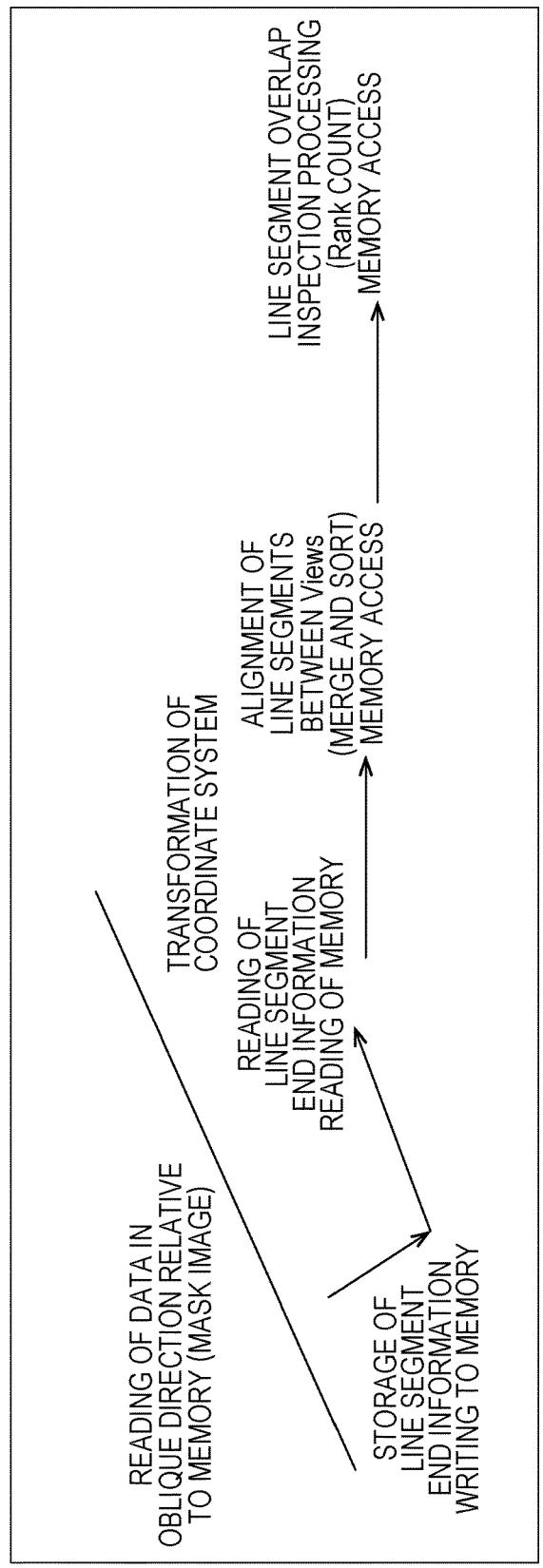
FIG. 26 is a view for describing that bottlenecks in performances may be reduced by narrowing the range of line segment search while processing the reference view one by one with respect to the target view.
Figure 27:
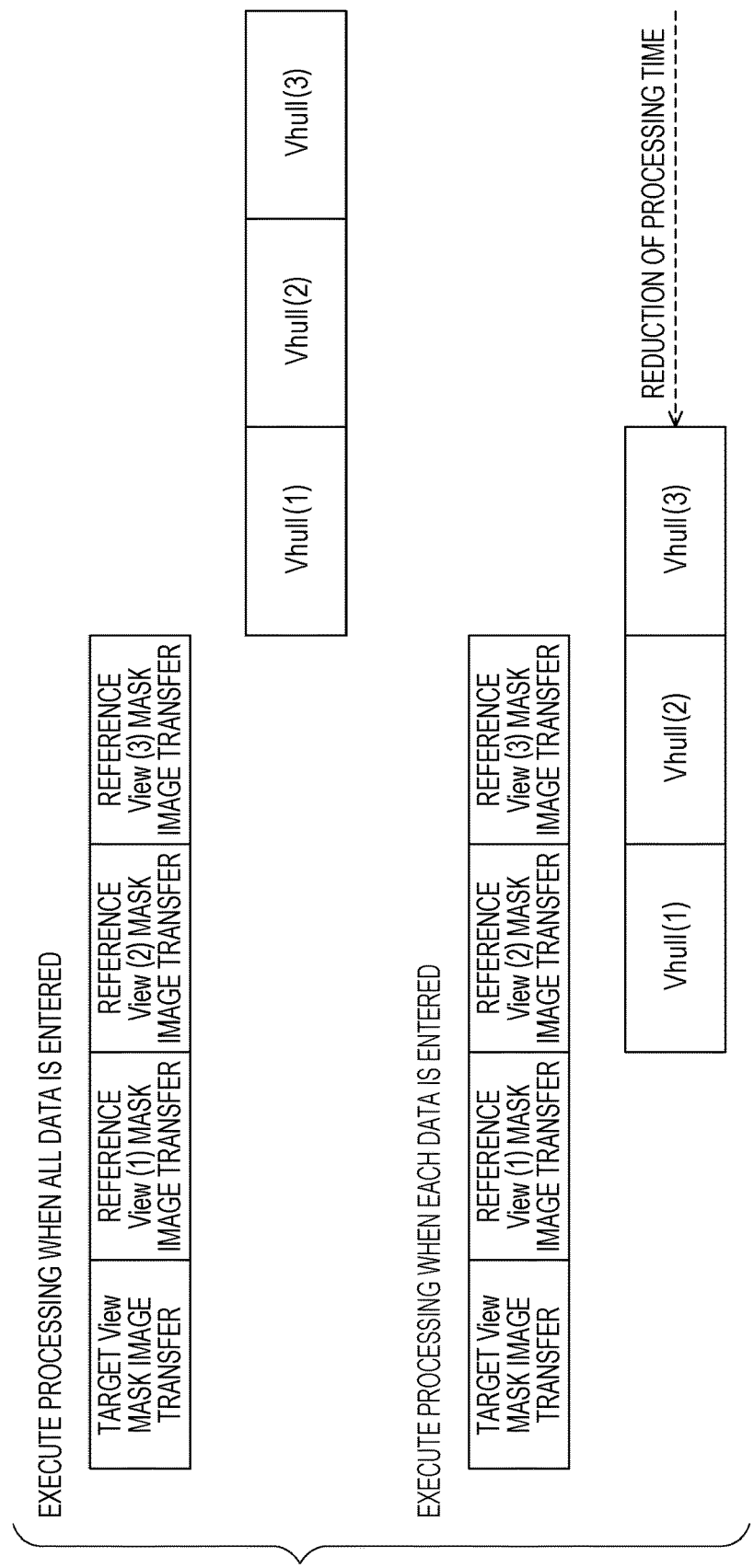
FIG. 27 is a view for describing the case where processing is executed when all data is completed, and the case where processing is executed when each data is entered according to the present embodiment.

Next, merits of the pipeline processing are described. FIG. 26 is a view for describing that bottlenecks in performances may be reduced by narrowing the range of line segment search while processing the reference view one by one with respect to the target view. FIG. 27 is a view for describing the case where processing is executed when all data is completed, and the case where processing is executed when each data is entered according to the present embodiment.

As illustrated in FIG. 26, bottlenecks in performances may be reduced by narrowing the range of line segment search while processing the reference view one by one with respect to the target view. Especially, it is advantageous for the visual hull processing since the visual hull processing greatly deteriorates performances due to memory access.

In processing continuous data, it is advantageous that the reference view is processed one by one with respect to the target view. For example, due to the condition of data transfer band and processing time of silhouette image (mask image) generation processing, the silhouette image appropriately reaches from each view. In this case, as illustrated in FIG. 27, by executing the processing when necessity minimum silhouette images (the target view and one reference view) are completed (performing data entry and the in a pipeline manner), data transfer time may be contained in the processing time. For this reason, the total processing time may be reduced by executing the processing when all data is completed as compared to executing the processing when each data is entered.

Figure 28:
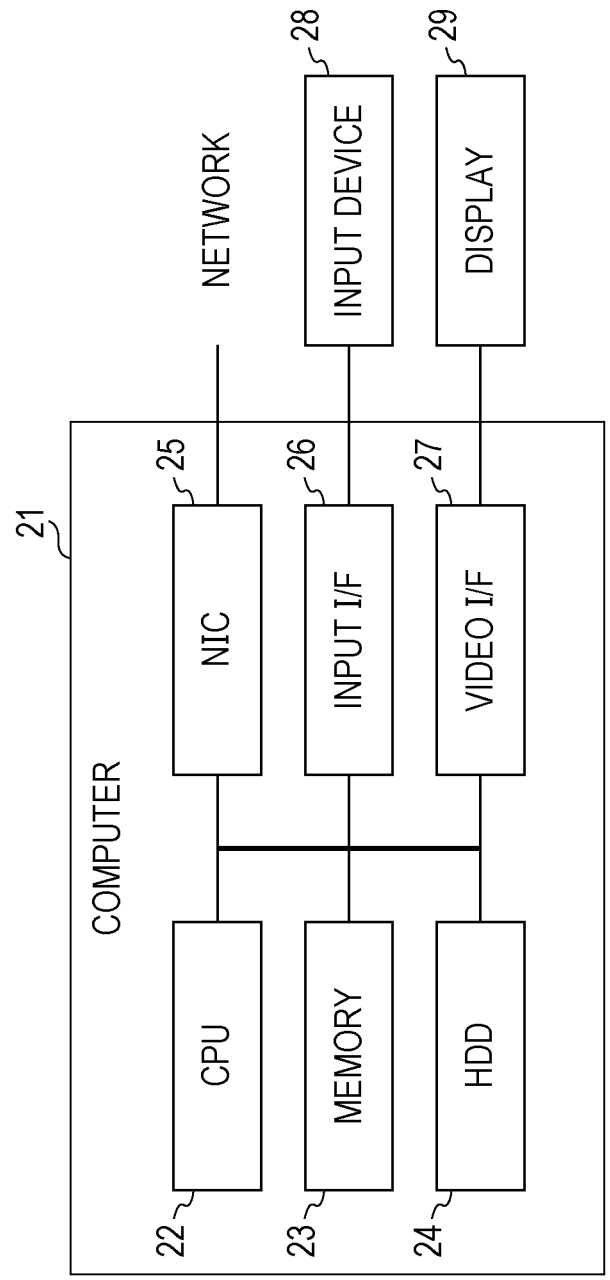
FIG. 28 is a view illustrating an example of a hardware configuration according to the present embodiment.

FIG. 28 is a view illustrating an example of a hardware configuration according to the present embodiment. The information processing apparatus 101 and the three dimensional shape reconstruction apparatus 1 each are a computer 21, for example. As illustrated in FIG. 28, the computer 21 includes a central processing unit (CPU) 22, a memory 23, a hard disc drive (HDD) 24, a network interface card (NIC) 25, an input interface 26, and a vide interface 27. The interface will be hereinafter referred to as "I/F".

The CPU 22 is connected to the memory 23, the HDD 24, the NIC 25, the input I/F 26, and the video I/F 27. The input I/F 26 is connected to an input device 28 such as keyboard, mouse, and camera. The video I/F 27 is connected to a display 29.

The CPU 22 is an example of the processor, and is a central processing unit that controls the operation of the entire computer 21. The memory 23 functions as a working area.

The HDD 24 is an example of the mass storage device, and is a storage device for storing the operating system (OS) and a simulation program. The NIC 25 is an interface for wired or wireless connection to the communication network such as the Internet and Local Area Network (LAN).

The input I/F 26 is an interface for transmitting an instruction from the input device 28 to the CPU 22. The video I/F 27 is an interface for outputting images to the display 29.

The CPU 22 reads the program according to the present embodiment, which is stored in the HDD 24, and performs the program. It is assumed that image data from the base camera (target camera) and the reference camera, and the other data are stored in the HDD 24 in advance. The program according to the present embodiment is not limited to the HDD 24, and may be recorded in various non-transitory recording media including an external device connected via the network, or portable recording media such as memory card and optical disc.

While the computer 21 performs the program according to the present embodiment, the CPU 22 functions (operates) as the transformation unit 102, the detection unit 103, and the search unit 104 in the information processing apparatus 101 in FIG. 1. While the computer 21 performs the program according to the present embodiment, the memory 23 and the HDD 24, or any other suitable storage device or recording medium function as the storage unit 105 in the information processing apparatus 101 in FIG. 1.

Further, from another aspect, while the computer 21 performs the program according to the present embodiment, the CPU 22 functions (operates) as the silhouette image separation unit 3, the parameter generation unit 4, the visual hull unit 5, and the rendering unit 6 in the three dimensional object reconstruction apparatus 1 in FIG. 6.

According to the present embodiment, a line segment range setting unit for adding the minimum line segment end and the maximum line segment end of the z coordinate in the line segment overlap range of the reference views previously processed by the line segment overlap inspection unit to the limitation of the range of line segment search of the subsequent reference view may be provided.

Thereby, in performing line segment search of each reference view in the range from Max (zNear, window end Near) to Min (zFar, window end Far), the operation amount of the line segment search unit and the line segment overlap inspection unit, and memory use amount of the line segment buffer may be reduced.

The present disclosure is not limited to the above-mentioned embodiment, and may have various configurations or operating modes without deviating from the subject matter of the present disclosure.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An information processing apparatus comprising:
    a memory; and
    a processor coupled to the memory and configured to:
        sequentially acquire, from a plurality of reference imaging devices for imaging a silhouette imaged with a base imaging device from viewpoints different from a viewpoint of the base imaging device, silhouette existing position information based on the reference imaging devices, the silhouette existing position information indicating an existing position of the silhouette, and transform the silhouette existing position information into a common coordinate system,
        detect a silhouette absence range in which the silhouette does not exist, based on a result of comparison of the silhouette existing position information acquired this time and the silhouette existing position information acquired last time, and
        search a range in which the silhouette exists, based on the silhouette absence range.

2. The information processing apparatus according to claim 1, wherein:
    the processor accumulates the silhouette absence range, compares the accumulated silhouette absence range with the silhouette existing position information acquired this time, and detects the silhouette absence range based on a result of the comparison; and
    the processor searches a range in which the silhouette exists based on the silhouette absence range.

3. The information processing apparatus according to claim 1, wherein
    the processor detects the silhouette absence range by pipeline processing based on whether or not newly acquired silhouette existing position information overlaps the existing silhouette absence range, and adds the silhouette absence range detected based on a detection result to the existing silhouette absence range.

4. The information processing apparatus according to claim 1, wherein
    the processor detects, in the range in which the silhouette exists for all of the silhouette existing position information, a first range that is nearer to a viewpoint of the base imaging device than a nearest end of the range to the viewpoint, and a second range that is further from the viewpoint of the base imaging device than a farthest end of the range, as the silhouette absence range.

5. The information processing apparatus according to claim 4, wherein
    when, in the range in which the silhouette exists for all of the silhouette existing position information, a third range in which a silhouette does not exist is included between the nearest end of the range to the viewpoint of the base imaging device and the farthest end of the range to the viewpoint of the base imaging device, the processor includes the third range in which the silhouette does not exist in the range in which the silhouette exists.

6. The information processing apparatus according to claim 4, wherein
    when, in the range in which the silhouette exists for all of the silhouette existing position information, a third range in which a silhouette does not exist is included between the nearest end of the range to the viewpoint of the base imaging device and the farthest end of the range to the viewpoint of the base imaging device, the processor detects the third range in which the silhouette does not exist as the silhouette absence range.

7. A non-transitory, computer-readable recording medium having stored therein a program for causing a computer to execute a process comprising:
    sequentially acquiring, from a plurality of reference imaging devices for imaging a silhouette imaged with a base imaging device from viewpoints different from a viewpoint of the base imaging device, silhouette existing position information based on the reference imaging devices, the silhouette existing position information indicating an existing position of the silhouette, and transforming the silhouette existing position information into a common coordinate system;
    detecting a silhouette absence range in which the silhouette does not exist, based on a result of comparison of the silhouette existing position information acquired this time and the silhouette existing position information acquired last time; and
    searching a range in which the silhouette exists, based on the silhouette absence range.

8. The non-transitory, computer-readable recording medium of claim 7, the process further comprising:
    accumulating the silhouette absence range after the searching;
    comparing the accumulated silhouette absence range with the silhouette existing position information acquired this time, and detecting the silhouette absence range based on a result of the comparison; and
    searching a range in which the silhouette exists based on the silhouette absence range.

9. The non-transitory, computer-readable recording medium of claim 7, the process further comprising:
    detecting the silhouette absence range by pipeline processing based on whether or not newly acquired silhouette existing position information overlaps the existing silhouette absence range, and adding the silhouette absence range detected based on a detection result to the existing silhouette absence range.

10. An information processing method comprising:
    sequentially acquiring, from a plurality of reference imaging devices for imaging a silhouette imaged with a base imaging device from viewpoints different from a viewpoint of the base imaging device, silhouette existing position information based on the reference imaging devices, the silhouette existing position information indicating an existing position of the silhouette, and transforming the silhouette existing position information into a common coordinate system;

detecting a silhouette absence range in which the silhouette does not exist, based on a result of comparison of the silhouette existing position information acquired this time and the silhouette existing position information acquired last time; and searching a range in which the silhouette exists, based on the silhouette absence range.

11. The information processing method of claim 10, further comprising:

accumulating the silhouette absence range after the searching;

comparing the accumulated silhouette absence range with the silhouette existing position information acquired this time, and detecting the silhouette absence range based on a result of the comparison; and searching a range in which the silhouette exists based on the silhouette absence range.

12. The information processing method of claim 10, further comprising:

detecting the silhouette absence range by pipeline processing based on whether or not newly acquired silhouette existing position information overlaps the existing silhouette absence range, and adding the silhouette absence range detected based on a detection result to the existing silhouette absence range.

13. An information processing device comprising:

a memory storing instructions; and a processor, coupled to the memory, that executes the instructions to perform a process comprising:

generating a plurality of viewpoint images, of an object, obtained from a plurality of viewpoints from at least a base image device and a reference image device;

separating silhouette images of the object from the viewpoint images;

acquiring a plurality of image device parameters;

acquiring a base silhouette image from the base image device and a reference silhouette image from the reference image device;

generating transformation information based on the image device parameters; and rendering a three-dimensional image of the object based on the viewpoint images, silhouette images, image device parameters, and the transformation information.

14. The information processing apparatus of claim 13, further comprising acquiring image device identifying information for the base image device and the reference image device.

15. The information processing apparatus of claim 14, further comprising calculating depth information of the object based on the image device identifying information, the transformation information, and the plurality of silhouette images.

16. The information processing device of claim 13, wherein the image device parameters comprise any of optical parameters and positional parameters.

* * * * *